United States Patent
Adjakple et al.

(10) Patent No.: US 12,543,080 B2
(45) Date of Patent: Feb. 3, 2026

(54) MULTI-SIM UE CELL SELECTION AND RESELECTION

(71) Applicant: INTERDIGITAL PATENT HOLDINGS, INC., Wilmington, DE (US)

(72) Inventors: Pascal Adjakple, Great Neck, NY (US); Joseph Murray, Schwenksville, PA (US); Zhuo Chen, Claymont, DE (US); Rocco Di Girolamo, Laval (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 384 days.

(21) Appl. No.: 17/776,894

(22) PCT Filed: Nov. 12, 2020

(86) PCT No.: PCT/US2020/060221
§ 371 (c)(1),
(2) Date: May 13, 2022

(87) PCT Pub. No.: WO2021/097082
PCT Pub. Date: May 20, 2021

(65) Prior Publication Data
US 2022/0408328 A1    Dec. 22, 2022

Related U.S. Application Data

(60) Provisional application No. 62/934,733, filed on Nov. 13, 2019.

(51) Int. Cl.
*H04W 36/00*    (2009.01)
*H04W 48/18*    (2009.01)
*H04W 88/06*    (2009.01)

(52) U.S. Cl.
CPC ....... *H04W 36/0061* (2013.01); *H04W 48/18* (2013.01); *H04W 88/06* (2013.01)

(58) Field of Classification Search
CPC ..... H04W 88/06; H04W 88/02; H04W 88/00; H04W 8/183; H04W 8/18; H04W 8/205;
(Continued)

(56) References Cited

U.S. PATENT DOCUMENTS 7,062,271 B2 *   6/2006  Choi ..................... H04W 48/20
                                                455/434
10,863,394 B2 * 12/2020  Kim ...................... H04L 5/0091
(Continued)

FOREIGN PATENT DOCUMENTS

WO        2015/038237 A1     3/2015

OTHER PUBLICATIONS

"Technical Specification Group Core Network and Terminals; Non-Access-Stratum (NAS) functions related to Mobile Station (MS) in idle mode," 3rd Generation Partnership Project, 3GPP TS 23.122 V16.3.0, (Release 16), Sep. 2019, pp. 75.
(Continued)

Primary Examiner — Diana J. Cheng
(74) Attorney, Agent, or Firm — Flaster Greenberg P.C.

(57) ABSTRACT

The present application describes methods and systems for cell selection and reselection. One aspect describes the apparatus including a non-transitory memory including executable instructions for cell selection or cell reselection, which when executed by a processor, performs the instructions of determining one or more new public land mobile networks (PLMNs) have been selected. The processor is also configured to execute the instructions of scanning radio frequencies for one or more cells in one or more of the selected PLMNs. The processor is further configured to execute the instructions of determining the one or more cells
(Continued)

to be an acceptable cell, a suitable cell, not an acceptable cell, or not a suitable cell. The processor is even further configured to execute the instructions of determining a state of the apparatus to be a multi-camped normally state, a reduced power any cell selection state, a reduced power camped on any cell, a camped normally state, an any cell selection state, or a camped on any cell state.

19 Claims, 14 Drawing Sheets

(58) Field of Classification Search
CPC ....... H04W 8/20; H04W 8/00; H04W 60/005; H04W 60/00; H04W 76/15; H04W 76/16; H04W 76/10; H04W 76/00; H04W 76/28; H04W 76/20
See application file for complete search history.

(56) References Cited

U.S. PATENT DOCUMENTS

| | | |
|---|---|---|
| 2014/0378140 A1 | 12/2014 | Gopal et al. |
| 2015/0079986 A1 | 3/2015 | Nayak et al. |
| 2018/0041936 A1 | 2/2018 | Kim et al. |
| 2019/0268963 A1 | 8/2019 | Kim et al. |

OTHER PUBLICATIONS

"Technical Specification Group Radio Access Network; NR; User Equipment (UE) procedures in Idle mode and RRC Inactive state," 3rd Generation Partnership Project, 3GPP TS 38.304 V15.0.0, (Release 15), Jun. 2018, pp. 25.

"Technical Specification Group Radio Access Network; NR; User Equipment (UE) procedures in Idle mode and RRC Inactive state," 3rd Generation Partnership Project, 3GPP TS 38.304 V16.1.0, (Release 16), Jul. 2020, pp. 39.

$3^{rd}$ Generation Partnership Project; "Technical Specification Group Radio Access Network; NR; User Equipment (UE) procedures in Idle mode and RRC Inactive state (Release 15)", 3GPP TS 38.304 V15.5.0, Sep. 2019, 29 pages.

\* cited by examiner

MULTI-SIM UE CELL SELECTION AND RESELECTION

CROSS-REFERENCE TO RELATED APPLICATIONS

The present application is the National Stage Application of International Patent Application No. PCT/US2020/060221, filed Nov. 12, 2020 which claims the benefit of priority of U.S. Provisional application No. 62/934,733 filed Nov. 13, 2019, the contents of which is incorporated herein.

FIELD

The present application is directed to methods and systems for Multi-SIM user equipment (UE) cell selection and reselection.

BACKGROUND

Dual-SIM or Multi-SIM operation presents many challenges regarding UE behaviors. If not addressed through specification, it negatively impacts user experience and overall system performance. For example, if a Multi-SIM UE is designed to perform idle mode procedures such as cell selection, or cell reselection and related measurement on each SIM exactly as if the UE was operating with only one SIM without any optimization to account for the fact that the UE is equipped with more than one SIM, the processing load and power consumption is likely to be severalfold that of a single Sim UE. For example, in the case of Dual-SIM, the processing load and power consumption might double, and the battery life shortened, with the negative impact of hindering a large market adoption of Multi-SIM devices. What is needed in the art is a technique and device to address the inefficiencies of existing cell selection procedures, cell reselection procedures, and access stratum procedures in support of PLMN selection, in the context of Multi-SIM operation to avoid excessive power consumption and shortening of the UE battery life.

Currently a UE may not be able to select/re-select another inter-RAT (e.g., NR) while remaining camped on one RAT (e.g., LTE). For example, according to the current specification, when the UE perform the inter-RAT re-selection to another RAT (e.g., from LTE to NR), the camping on one RAT (e.g., LTE) will be lost. This behavior might not be desirable in the case of Multi-SIM devices such as DSSS, DSDS or DSDA Multi-SIM devices. Additionally, the UE may trigger unnecessary measurement and cell re-selection to the inter-RAT re-selection. According to the current LTE specification, the rule of another inter-RAT frequency (e.g., NR) with a reselection priority higher than the reselection priority of the current RAT frequency (e.g., LTE) could be broadcast in SIBx. According to the exemplary embodiment shown in FIG. 2, the UE camping in both NR frequency (e.g., F3) and LTE frequency (e.g., F1) could meet the case the cell quality of one RAT is below the threshold configured by the network (e.g., (Srxlev(F1)≤SnonintraSearchP(F1))), while the cell quality of another RAT is still above the threshold configured by the network (e.g., (Srxlev(F3) >SnonintraSearchP(F3))). Alternatively, the NR frequency could have higher priority than LTE frequency, and the UE will trigger inter-RAT measurement on F4 of the NR frequency. The measurement on F4 is not expected, as the UE has already camped on F3 of the NR frequency which has a good radio condition. Further, the UE could trigger the inter-RAT re-selection from F1 to F4 instead of re-selecting F2 of the LTE frequency. This would lead to loss of camping in LTE. Frequent cell (re)selection may also negatively impact UE battery life resulting in negative user experience.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application described herein, with aspects of the application are at least directed to the following aspects.

One aspect of the application is directed an apparatus. The apparatus includes a non-transitory memory including executable instructions for cell selection or cell reselection, which when executed by a processor, performs the instructions of determining one or more new public land mobile networks (PLMNs) have been selected. The processor is also configured to execute the instructions of scanning radio frequencies for one or more cells in one or more of the selected PLMNs. The processor is further configured to execute the instructions of determining the one or more cells to be an acceptable cell, a suitable cell, not an acceptable cell, or not a suitable cell. The processor is yet further configured to execute the instructions of determining a state of the apparatus to be a multi-camped normally state, a reduced power any cell selection state, a reduced power camped on any cell, a camped normally state, an any cell selection state, or a camped on any cell state.

Another aspect of the application is directed to a method for cell selection or reselection. The method includes a step of determining one or more new public land mobile networks (PLMNs) have been selected. The method also includes a step of scanning radio frequencies for one or more cells in one or more of the selected PLMNs. The method further includes a step determining the one or more cells to be an acceptable cell, a suitable cell, not an acceptable cell, or not a suitable cell. The method even further includes a step of determining a state of the apparatus to be a multi-camped normally state, a reduced power any cell selection state, a reduced power camped on any cell, a camped normally state, an any cell selection state, or a camped on any cell state.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF THE ILLUSTRATIVE EMBODIMENTS

Figure 1A:
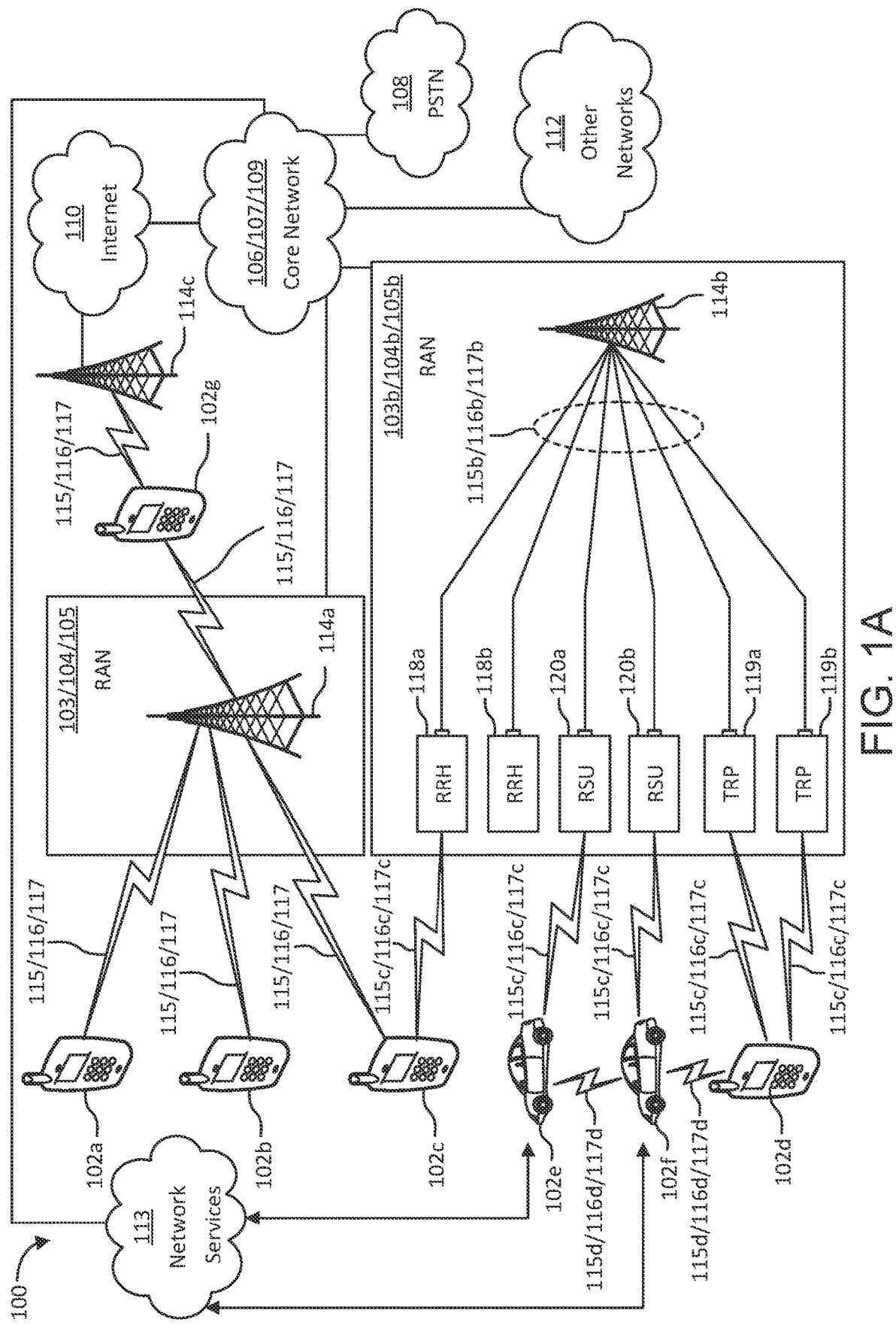
FIG. 1A illustrates an exemplary communications system according to an aspect of the application.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other. Reference in this specification to "one aspect," "an aspect," or "one or more aspects," or the like encompasses one or more embodiments listed thereunder.

Definitions/Acronyms

Provided below are definitions for terms and phrases commonly used in this application in Table 1.

TABLE 1

| Acronym | Term or Phrase |
| --- | --- |
| 3GPP | 3$^{rd}$ Generation Partnership Project |
| 5G | 5$^{th}$ Generation |
| 5GS | 5G System |
| AS | Access Stratum |
| BCCH | Broadcast Control Channel |
| CMAS | Commercial Mobile Alert System |
| CN | Core Network |
| DCI | Downlink Control Information |
| DSDA | Dual SIM Dual Active |
| DSDS | Dual Sim Dual Standby |
| DSSS | Dual SIM Single Standby |
| DRX | Discontinuous Reception |
| eNB | Evolved Node B |
| EPLMN | Equivalent PLMN |
| EPS | Evolved Packet System |
| ETWS | Earthquake and Tsunami Warning System |
| E-UTRA | Evolved UMTS Terrestrial Radio Access |
| E-UTRAN | Evolved UMTS Terrestrial Radio Access Network |
| FDD | Frequency Division Duplex |
| gNB | NR NodeB |
| IMS | IP Multimedia Subsystem |
| LTE | Long Term Evolution |

TABLE 1-continued

| Acronym | Term or Phrase |
| --- | --- |
| MNO | Mobile Network Operator |
| NAS | Non AS |
| NB | NodeB |
| NR | New Radio |
| PBR | Prioritized Bit Rate |
| PHY | Physical Layer |
| PLMN | Public Land Mobile Network |
| P-RNTI | Paging RNTI |
| SIB | System Information Block |
| SIM | Subscriber Identity Module |
| SMTC | SSB Measurement Timing Configuration |
| SS | Synchronization Signal |
| RAN | Radio Access Technology |
| RAT | Radio Access Technology |
| RNTI | Radio Network Temporary Identifier |
| RRC | Radio Resource Control |
| RSRP | Reference Signal Received Power |
| RSRQ | Reference Signal Received Quality |
| RSSI | Received Signal Strength Indicator |
| RX | Receiver or Receiving |
| TDD | Time Division Duplex |
| TX | Transmitter or Transmitting |
| UE | User Equipment |
| UMTS | Universal Mobile Telecommunications System |
| USIM | Universal Subscriber Identify Module |

Terminology

Provided below is terminology for commonly used phrases or terms in the application:

Available PLMN(s): One or more PLMN(s) for which the UE has found at least one cell and read its PLMN identity (ies).

Barred Cell: A cell a UE is not allowed to camp on.

Camped on a cell: UE has completed the cell selection/reselection process and has chosen a cell. The UE monitors system information and (in most cases) paging information.

Camped on any cell: UE is in idle mode and has completed the cell selection/reselection process and has chosen a cell irrespective of PLMN identity.

Commercial Mobile Alert System: Public Warning System that delivers Warning Notifications provided by Warning Notification Providers to CMAS capable UEs.

Equivalent PLMN (EPLMN) list: List of PLMNs considered as equivalent by the UE for cell selection, cell reselection, and handover according to the information provided by the NAS.

Equivalent network list: List of networks considered as equivalent by the UE for cell selection, cell reselection, and handover according to the information provided by the NAS.

Process: A local action in the UE invoked by an RRC procedure or an RRC_IDLE or RRC_INACTIVE state procedure.

Radio Access Technology: Type of technology used for radio access, for instance NR or E-UTRA.

Registration Area: (NAS) registration area is an area in which the UE may roam without a need to perform location registration, which is a NAS procedure.

Registered PLMN: PLMN on which Location Registration has been successful, with the registered PLMN indicated in the registration area identity.

Selected PLMN: PLMN that has been selected by the NAS, either manually or automatically. Selected PLMN may be associated with an EPLMN list.

Serving cell: Cell on which the UE is camped.

Strongest cell: Cell on a particular frequency that is considered strongest according to the layer 1 cell search procedure.

Suitable Cell: Cell on which a UE may camp, according to specified criteria.

Available PLMN(s): One or more PLMN(s) for which the UE has found at least one cell and read its PLMN identity(ies).

Independent list of equivalent networks: List of equivalent network lists with one list per SIM.

Independent list of equivalent PLMNs: List of equivalent PLMN lists with one list per SIM.

Serving network: A network serving the UE for either idle mode operation or connected mode operation. A serving network is associated with a serving SIM. A network may be in reference to a RAN or a PLMN or a combination thereof.

Serving PLMN: A PLMN serving the UE for either idle mode operation or connected mode operation. A serving PLMN is associated with a serving SIM.

Serving RAN: A RAN serving the UE for either idle mode operation or connected mode operation. A serving RAN is associated with a serving SIM.

Network: Depending on the context, network may be core network, radio access network or a combination thereof.

SIM: Subscriber Identity Module. The present application makes no distinction between SIM and USIM.

Multi-SIM UE: UE with two or more SIMs. Dual-SIM: UE with two SIMs. The term Multi-SIM and Dual-SIM are used interchangeably in this application.

Serving SIM: A SIM that has been selected for use by the UE for either idle mode operation or connected mode operation.

RRC_IDLE for a specific SIM: The UE is in RRC_IDLE for a specific SIM when no RRC connection is established for that SIM i.e., no RRC connection is established for a selected network or any of the equivalent networks associated with the specific SIM. The terms RRC_IDLE, SIM level RRC_IDLE or RRC_IDLE for a specific SIM will be used interchangeably.

RRC_CONNECTED for a specific SIM: The UE is in RRC_CONNECTED for a specific SIM when an RRC connection is established and not suspended for that SIM i.e., an RRC connection is established for a selected network or any of the equivalent networks associated with the specific SIM and is not suspended. The terms RRC_CONNECTED, SIM level RRC_CONNECTED or RRC_CONNECTED for a specific SIM will be used interchangeably.

RRC_INACTIVE for a specific SIM: The UE is in RRC_INACTIVE for a specific SIM when an RRC connection is established for that SIM but suspended i.e., an RRC connection is established for a selected network or any of the equivalent networks associated with the specific SIM and is suspended. The terms RRC_INACTIVE, SIM level RRC_INACTIVE or RRC_INACTIVE for a specific SIM will be used interchangeably.

As described in substantive detail below in the present application with respect to the UE, the AS shall report available PLMNs to the NAS on request from the NAS. This may also be reported autonomously. The request from NAS may be on a per SIM basis or per UE basis, It may alternatively be for more than one SIM. The report of available PLMNs may be per SIM. Further, the result of the multi-PLMN selection procedure is a list of identifiers of the selected PLMNs, with one selected PLMN per SIM. The AS may report to NAS that a set of available PLMNs associated with different SIMs are broadcasted by the same cell, the same frequency carrier, or the same RAT.

The UE may apply different measurement performance requirements. The UE may also apply different configuration parameter sets for the evaluation of cell selection criteria or cell reselection criteria (both serving cell and neighboring cells) in a reduced power or Multi-SIM power saving mode. Envisaged in this application are specific new relaxed requirements for measurement and evaluation of serving cell, new relaxed measurement requirements for intra-frequency NR cells, inter-frequency NR cells, and/or inter-RAT E-UTRAN cells.

UE splits UE measurement capabilities, UE cell selection evaluation capabilities or UE cell reselection evaluation capabilities across the serving SIMs autonomously or based on network configuration. Alternatively, the UE assumes operation capabilities configured into the UE, for example, when single SIM operation is an application to each serving SIM in Multi-SIM operation. However, the measurement requirements, e.g., measurement duty cycle, cell selection and/or reselection parameters, are relaxed to maintain the same processing overhead level or power consumption level as a single-SIM operation.

It is envisaged in the present application to relax Multi-SIM power saving mode operation, and the maximum interruption time in paging reception requirement as a result of cell reselection. Specifically, parameters impacting determination of the interruption time such as $T_{SI-NR}$, $T_{target\_cell\_SMTC\_period}$ may be relaxed. For example, the UE may use different values of these parameters configured into the UE by the network in support of a Multi-SIM power saving mode operation.

New cell selection and reselection states and acceptable state transitions are introduced with the objective to reduce Multi-SIM UE power consumption i.e., have a power consumption level comparable to that of Single-SIM UE. The new states may include the following: Multi-Camped Normally, Reduced Power Any Cell Selection, and Reduced Power Camped on Any Cell.

In a Multi-Camped Normally state, the UE is camped normally for two or more serving SIMs. The UE may be in RRC_IDLE or RRC_INACTIVE on two or more SIMs. The UE uses relaxed measurement and cell evaluation criteria for cell selection or cell reselection. The UE may be configured by the network with relaxed measurement and cell evaluation criteria for cell selection or cell reselection, specific to this state. Here, if the cell selection process fails to find a suitable cell after a complete scan of all RATs and all frequency bands supported by the UE, the UE is not required to find an acceptable cell, and may transition to Reduced Power Any Cell Selection state as long as the UE remained normally camped on at least one other cell with respect to one of the serving SIM. The UE may remain on Any Cell Selection state for a SIM where cell reselection process fails, and performs measurements and cell evaluations for cell selection, or cell reselection according to relaxed measurement and relaxed cell evaluation criteria.

In Reduced Power Any Cell Selection state, the UE is in Camped Normally state for at least one serving SIM and is in Any Cell Selection state on at least one other SIM. The UE uses relaxed measurement and cell evaluation criteria for cell selection or cell reselection. The UE may be configured by the network with relaxed measurement and cell evaluation criteria for cell selection or cell reselection, specific to this state. In this state, if the cell selection process fails to find a suitable cell after a complete scan of all RATs and all frequency bands supported by the UE, the UE is not required to find an acceptable cell as long as the UE remained normally camped on at least one other serving SIM, or as long as the UE is in Any Cell Selection state on at least one other serving SIM. The UE may remain on Any Cell Selection state for a SIM where cell reselection process fails, and performs measurements and cell evaluations for cell selection, or cell reselection according to relaxed measurement and relaxed cell evaluation criteria. The UE may transition to a Reduced Power Camped on any cell state from this state, for example when the cell selection process fails to find a suitable cell or an acceptable cell after a complete scan of all RATs and all frequency bands supported by the UE, and the UE is not in a Normally Camped state on any other serving SIM.

In Reduced Power Camp on any cell state, the UE may be in Any Cell Selection state for at least one serving SIM and in Camped on Any Cell state for at least one serving SIM. The UE uses relaxed measurement and cell evaluation criteria for cell selection or cell reselection. The UE may be configured by the network with relaxed measurement and cell evaluation criteria for cell selection or cell reselection, specific to this state. In this state, if the cell selection process fails to find a suitable cell after a complete scan of all RATs and all frequency bands supported by the UE, the UE may not require to find an acceptable cell as long as the UE found an acceptable cell on at least one other serving SIM, or as long as the UE is in Any Cell Selection state on at least one other serving SIM.

The criteria for the end of cell selection process i.e., cell selection process continue until a suitable cell is found for each serving SIM i.e., for each of the selected PLMN (or equivalently the registered PLMN or PLMN of the Equivalent PLMN list) per serving SIM, provided to the AS by the NAS, or the RF channels in the RAT bands according to the UE capabilities are exhausted, whichever comes first.

The UE may consider frequencies configured for RAN sharing, as higher priority than other frequencies if the resulting reselected cell is configured to serve PLMNs of more than one serving SIM.

It is envisaged the UE controls UE mobility state with a set of mobility state control parameters ($T_{CRmax}$, $N_{CR\_H}$, $N_{CR\_M}$) specific to Multi-SIM UE Operation. It is also envisaged the UE scales parameters $Treselection_{NR}$ or $Treselection_{EUTRA}$ differently. In order words, the UE applies different scaling factors to $Treselection_{NR}$ or $Treselection_{EUTRA}$, when operating in Multi-SIM power savings mode in order to ease the measurement burden. The UE may apply different scaling factor values to $Treselection_{NR}$ or $Treselection_{EUTRA}$ according to the UE mobility state, e.g., high mobility state versus medium mobility state. Further it is envisaged the UE scales the parameter $Q_{hyst}$ differently. In order words, the UE applies a different scaling factor to the parameter $Q_{hyst}$, when operating in Multi-SIM power savings mode in order to ease the measurement burden. The UE may apply a different scaling factor value to $Q_{hys}$ according to the UE mobility state, e.g., high mobility state versus medium mobility state.

General Architecture

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

FIG. 1A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 1A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 1B:
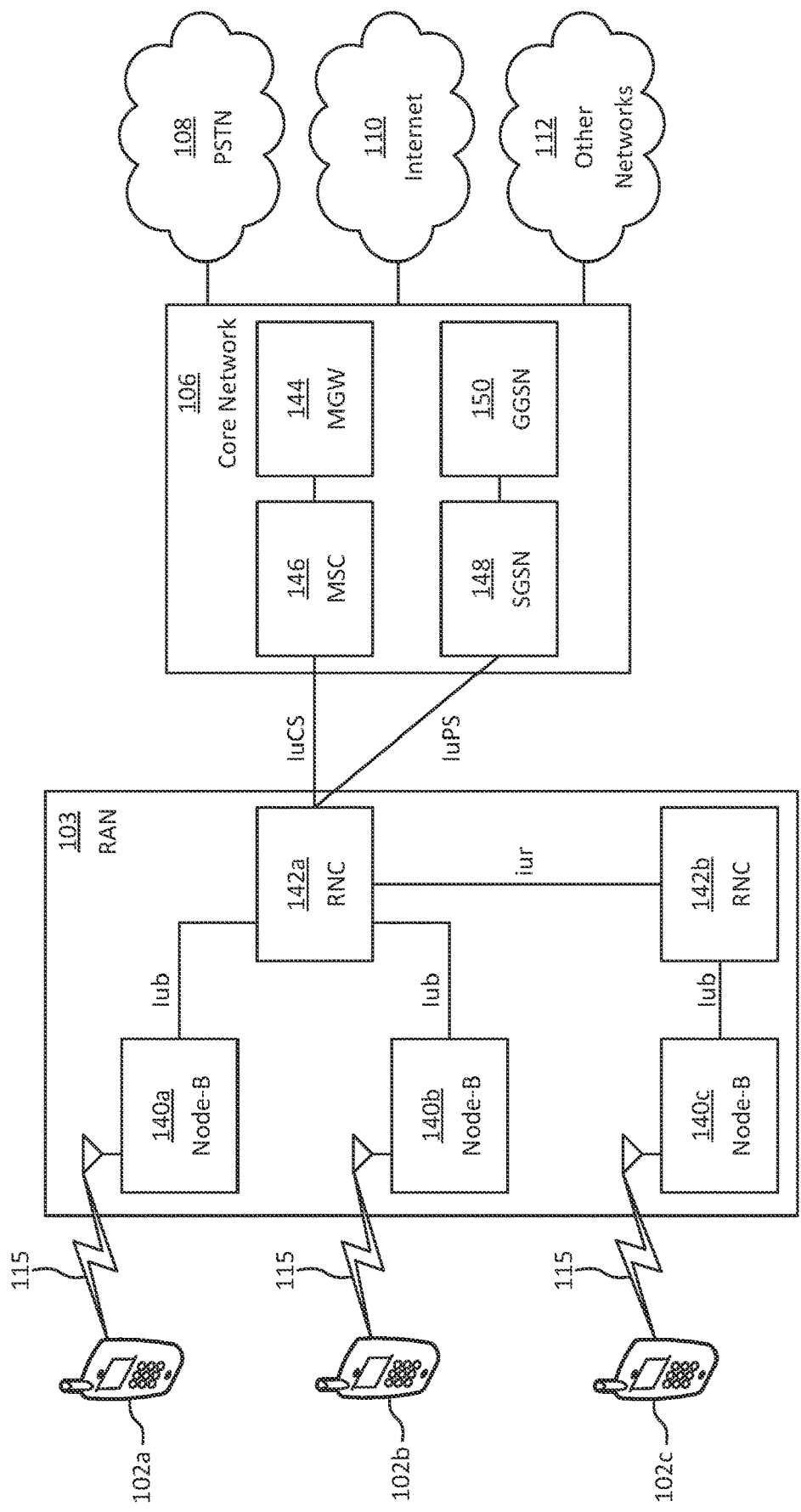
FIG. 1B illustrates an exemplary apparatus configured for wireless communication according to an aspect of the application.

FIG. 1B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 1B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 1B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 1B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 1C:
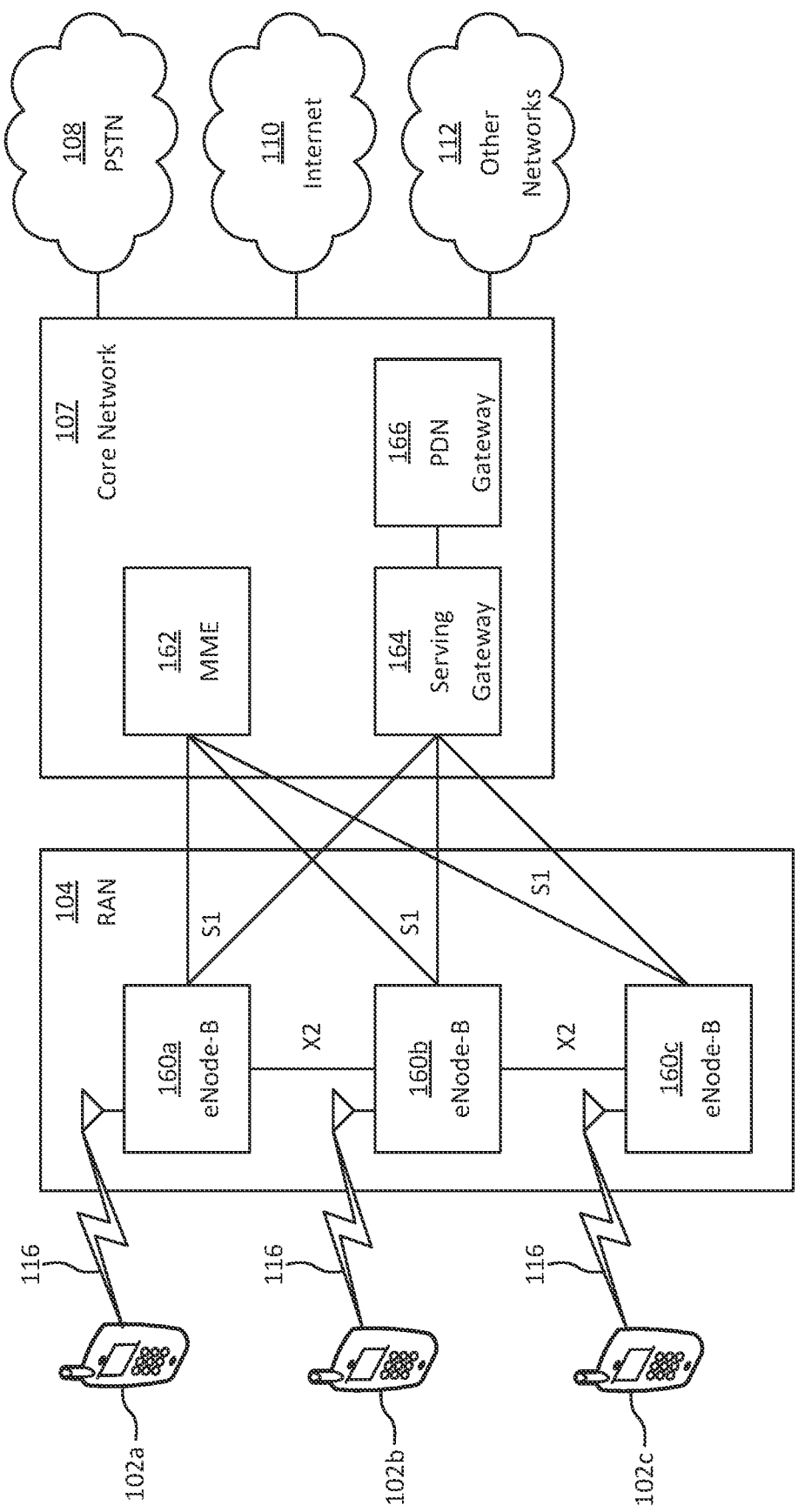
FIG. 1C illustrates a system diagram of a radio access network and a core network according to an aspect of the application.

FIG. 1C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1C, the eNode-Bs 160a, 160b, and 160c may communicate with one another over an X2 interface.

The core network 107 shown in FIG. 1C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 1D:
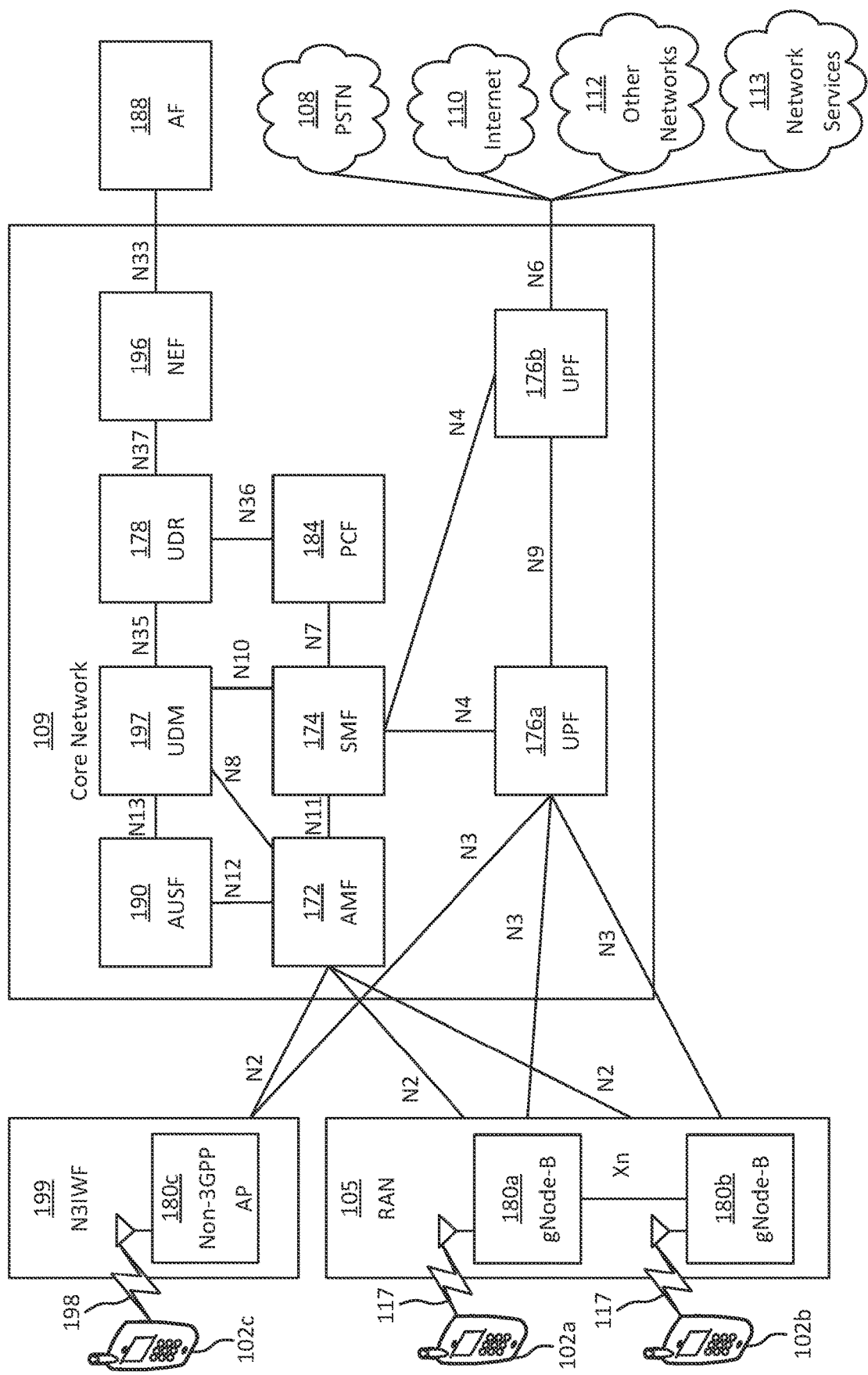
FIG. 1D illustrates a system diagram of a radio access network and a core network according to an aspect of the application.

FIG. 1D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1D, the gNode-Bs 180a and 180b may communicate with one another over an Xn interface, for example.

The core network 109 shown in FIG. 1D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in Figure x1G.

In the example of FIG. 1D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 1D shows that network functions directly connect to one another, however, it should be appreciated that they may communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 1D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g., in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 1D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1E:
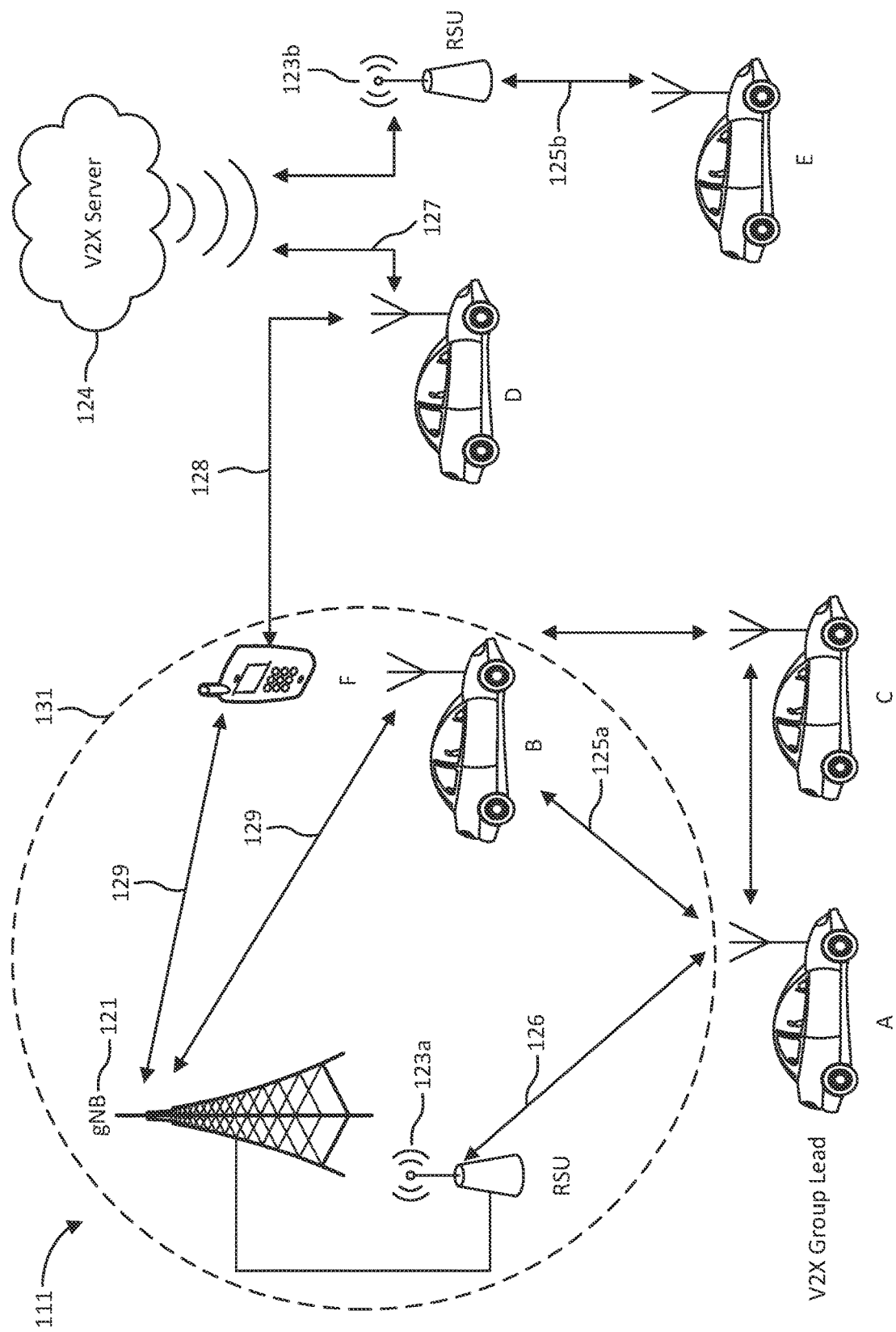
FIG. 1E illustrates a system diagram of a radio access network and a core network according to an aspect of the application.

FIG. 1E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 1E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 1E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 1F:
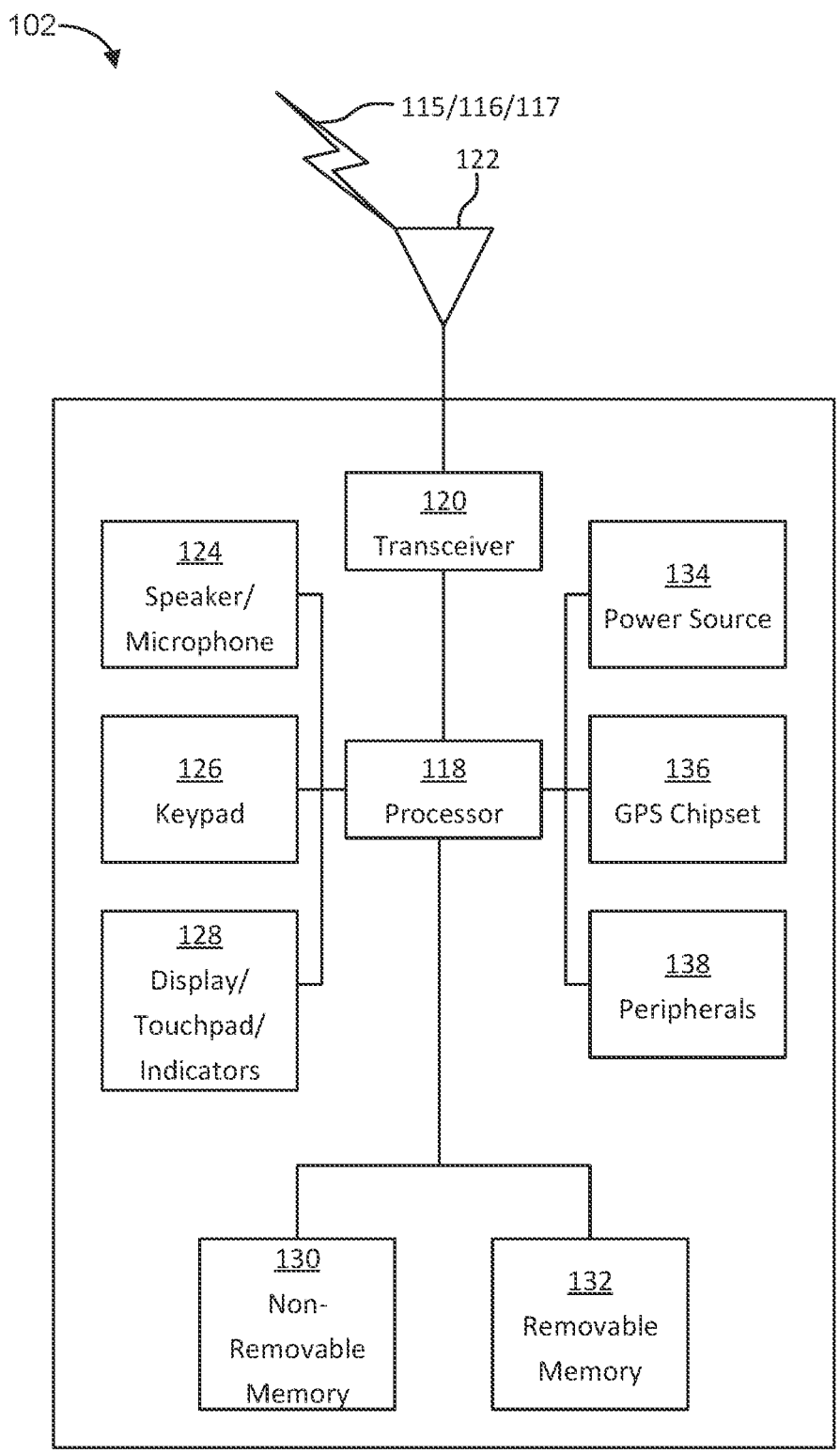
FIG. 1F illustrates a block diagram of an exemplary computing system in communication with one or more networks previously shown in FIGS. 1A, 1C, 1D and 1E according to an aspect of the application.

FIG. 1F is a block diagram of an example apparatus or device WTRU 102 that may be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 1A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1G:
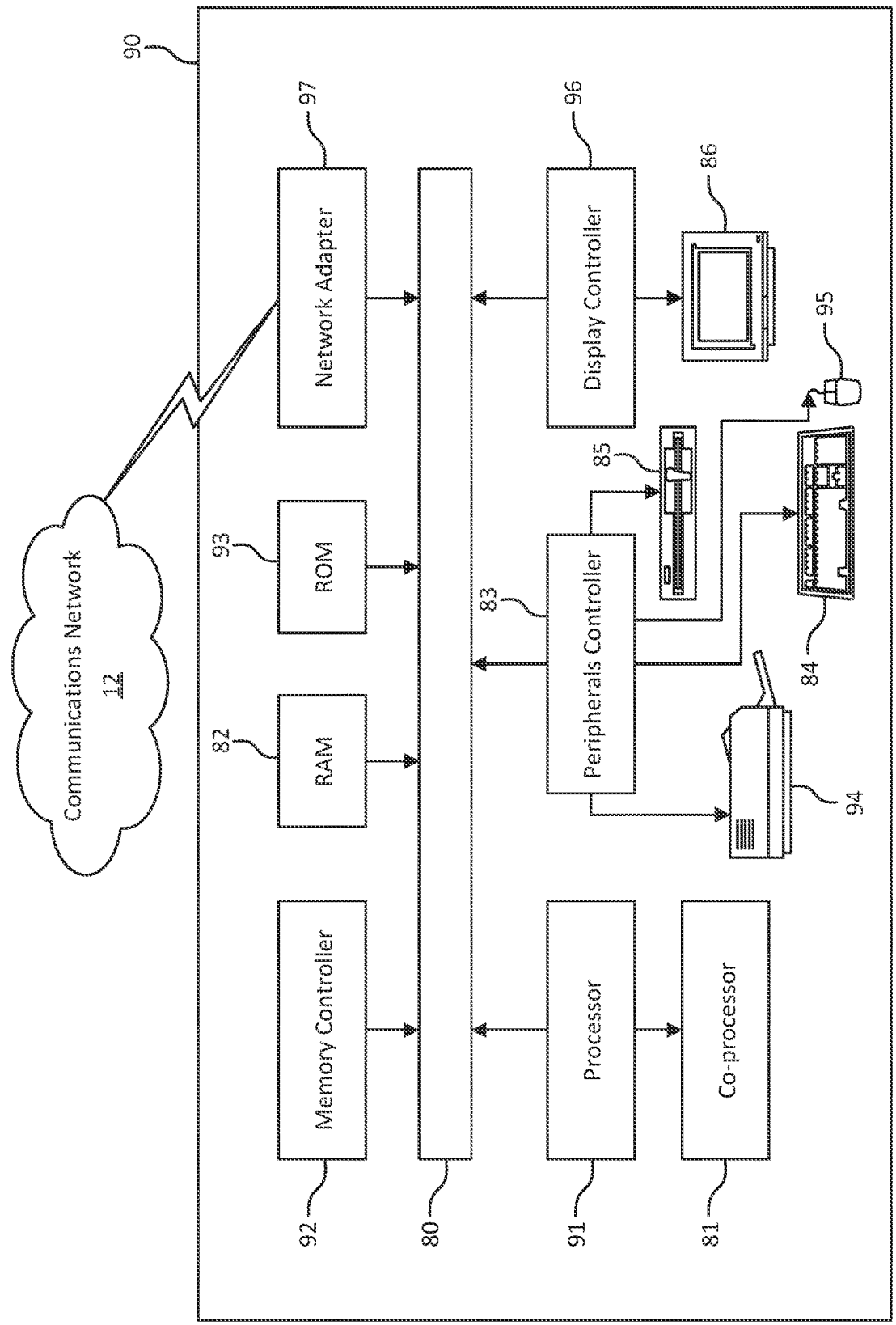
FIG. 1G illustrates an exemplary communications system according to an aspect of the application.
Figure 2:
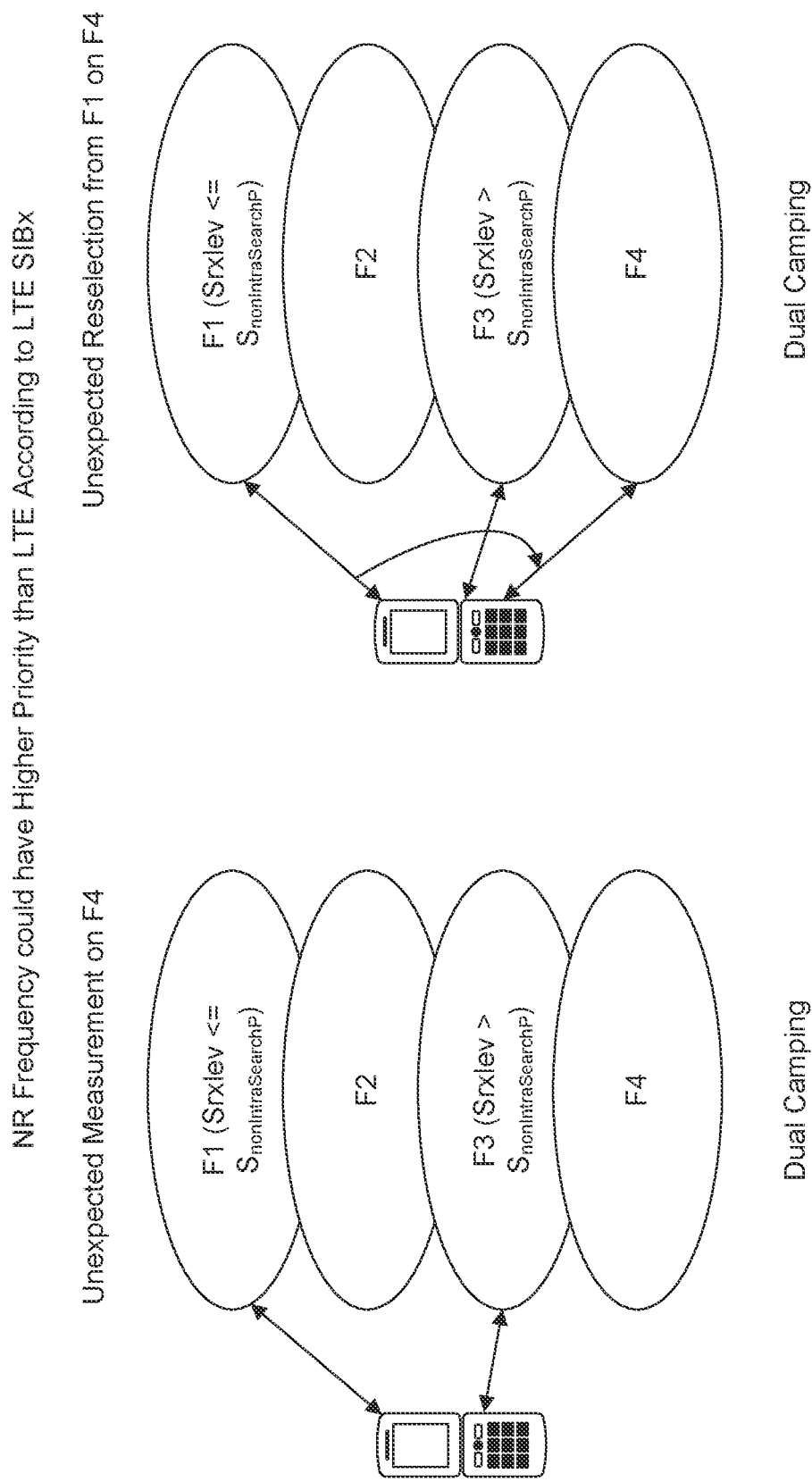
FIG. 2 illustrates unexpected measurement and cell reselection while dual camping (prior art).

FIG. 1G is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

Cell Reselection Parameters in System Information Broadcasts

Cell reselection parameters are broadcast in system information and read from the serving cell as follows:

absThreshSS-BlocksConsolidation: This specifies minimum threshold of the beam which can be used for selection of the highest ranked cell, if rangeToBestCell is configured.

cellReselectionPriority: This specifies the absolute priority for NR frequency or E-UTRAN frequency.

cellReselectionSubPriority: This specifies the fractional priority value added to cellReselectionPriority for NR frequency or E-UTRAN frequency.

$Qoffset_{s,n}$: This specifies the offset between the two cells.

$Qoffset_{frequency}$: Frequency specific offset for equal priority NR frequencies.

$Q_{hyst}$: This specifies the hysteresis value for ranking criteria.

$Qoffset_{temp}$: This specifies the additional offset to be used for cell selection and re-selection. It is temporarily used in case the RRC Connection Establishment fails on the cell as specified in TS 38.331.

$Q_{qualmin}$: This specifies the minimum required quality level in the cell in dB.

$Q_{rxlevmin}$: This specifies the minimum required Rx level in the cell in dBm.

$Q_{rxlevminoffsetcell}$: This specifies the cell specific Rx level offset in dB to Qrxlevmin.

$Q_{equalminoffsetcell}$: This specifies the cell specific quality level offset in dB to Qqualmin.

rangeToBestCell: This specifies the R value range which the cells whose R value is within the range can be a candidate for the highest ranked cell. It is configured in SIB2 and used for intra-frequency and equal priority inter-frequency cell reselection and among the cells on the highest priority frequency(ies) for inter-frequency cell reselection within NR.

TreselectionRAT: This specifies the cell reselection timer value. For each target NR frequency and for each RAT other than NR, a specific value for the cell reselection timer is defined, which is applicable when evaluating reselection within NR or towards other RAT (i.e., TreselectionRAT for NR is TreselectionNR, for E-UTRAN TreselectionEUTRA). TreselectionRAT is not broadcast in system information but used in reselection rules by the UE for each RAT.

$Treselection_{NR}$: This specifies the cell reselection timer value TreselectionRAT for NR. The parameter can be set per NR frequency as specified in TS 38.331.

$Treselection_{EUTRA}$: This specifies the cell reselection timer value TreselectionRAT for E-UTRAN.

$Thresh_{X, HighP}$: This specifies the Srxlev threshold (in dB) used by the UE when reselecting towards a higher priority RAT/frequency than the current serving frequency. Each frequency of NR and E-UTRAN might have a specific threshold.

$Thresh_{X, HighQ}$: This specifies the Squal threshold (in dB) used by the UE when reselecting towards a higher priority RAT/frequency than the current serving frequency. Each frequency of NR and E-UTRAN might have a specific threshold.

$Thresh_{X, LowP}$: This specifies the Srxlev threshold (in dB) used by the UE when reselecting towards a lower priority RAT/frequency than the current serving frequency. Each frequency of NR and E-UTRAN might have a specific threshold.

$Thresh_{X, LowQ}$: This specifies the Squal threshold (in dB) used by the UE when reselecting towards a lower priority RAT/frequency than the current serving frequency. Each frequency of NR and E-UTRAN might have a specific threshold.

$Thresh_{Serving, LowP}$: This specifies the Srxlev threshold (in dB) used by the UE on the serving cell when reselecting towards a lower priority RAT/frequency.

$Thresh_{Serving, LowQ}$: This specifies the Squal threshold (in dB) used by the UE on the serving cell when reselecting towards a lower priority RAT/frequency.

$S_{IntraSearchP}$: This specifies the Srxlev threshold (in dB) for intra-frequency measurements.

$S_{IntraSearchQ}$: This specifies the Squal threshold (in dB) for intra-frequency measurements.

$S_{nonIntraSearchP}$: This specifies the Srxlev threshold (in dB) for NR inter-frequency and inter-RAT measurements.

$S_{nonIntraSearchQ}$: This specifies the Squal threshold (in dB) for NR inter-frequency and inter-RAT measurements. Speed dependent reselection parameters are broadcast in system information and are read from the serving cell as follows:

$T_{CRmax}$: This specifies the duration for evaluating allowed amount of cell reselection(s).

$N_{CR\_M}$: This specifies the maximum number of cell reselections to enter Medium-mobility state.

$N_{CR\_H}$: This specifies the maximum number of cell reselections to enter High-mobility state.

$T_{CRmaxHyst}$: This specifies the additional time period before the UE can enter Normal-mobility state.

Speed dependent ScalingFactor for $Q_{hyst}$: This specifies scaling factor for $Q_{hyst}$ in sf-High for High-mobility state and sf-Medium for Medium-mobility state.

Speed dependent ScalingFactor for $Treselection_{NR}$: This specifies scaling factor for $Treselection_{NR}$ in sf-High for High-mobility state and sf-Medium for Medium-mobility state.

Speed dependent ScalingFactor for $Treselection_{EUTRA}$: This specifies scaling factor for $Treselection_{EUTRA}$ in sf-High for High-mobility state and sf-Medium for Medium-mobility state.

Multi-SIM Overview

Multi-USIM devices have been more and more popular in different countries. The user may have both a personal and a business subscription in one device or has two personal subscriptions in one device for different services (e.g., use one individual subscription and one "family circle" plan). However, support for multi-USIM within a device is currently handled in an implementation-specific manner without any support from 3GPP specifications, resulting in a variety of implementations and UE behaviours (e.g., Passive Dual SIM, Dual SIM Single Standby, Dual SIM Dual Standby, Dual SIM Dual Active, etc.). Such situation may cause increased complexity for UE vendors, unexpected UE behavior for network vendors or operators, and degraded user experience.

Passive Dual SIM: the device contains two SIMs, but only one can be selected for use at any given time, with the assumption that both SIMs share a single transceiver. While this implementation may be attractive in terms device complexity or unexpected UE behavior for network vendors or operators, it doesn't fulfil the promise of Dual SIM devices to allow the user of being reachable or available at any given time over two networks or to allow the user to perform concurrent communications over two networks which might belong to the same or different operators.

Dual SIM Single Standby UE (DSSS): while actively communicating with the first system, the UE needs to occasionally check the other system (e.g., to read the paging channel, perform measurements, or read the system information). This occasional activity on the second system may or may not have any performance impact, depending on the UE implementation, i.e., single Rx or dual Rx. Similarly, in the case of Dual SIM Dual Active devices.

Dual SIM Dual Standby (DSDS): both SIMs can be used for idle-mode network connection, but when a radio connection is active the second connection is disabled. As in the passive case, the SIMs in a DSDS device share a single transceiver. Through time multiplexing two radio connections are maintained in idle mode. When in-call on network for one SIM, although registration to the second network is maintained, it is no longer possible to maintain radio connection to the network of the second SIM, hence that connection is unavailable for the duration of the call unless procedures for sharing the single transceiver between the two Dual SIM Dual Active (DSDA): both SIMs can be used in both idle and connected modes, for example, one communication may be for voice service another communication may be for data service. It is assumed each SIM has a dedicated transceiver, meaning that there are no interdependencies on idle or connected mode operation at the modem level. But even for this case, concurrent communication with two systems present challenges that could be impact the UE performance and the network performance, some of those challenges include the UE power control and capability coordination so the power budget and capability budget of Multi-SIM devices are not exceeded. Considering Dual SIM Dual Active UE which is equipped with dual Rx/dual Tx can communicate with two systems, one communication may be for voice service another communication may be for data service. Even for this case, concurrent communication with two systems present challenges that could be impact the UE performance and the network performance, some of those challenges include the UE power control and capability coordination so the power budget and capability budget of Multi-SIM devices are not exceeded.

Multi-SIM Use Cases and Deployment Scenarios

Examples of typical Multi-SIM use cases are described below. These use case are merely exemplary and not meat to limit in anyway, the applicability of the solutions described herein.

Use Case 1:

A user is traveling abroad from the United States to Asia and has a UE that supports multiple USIM cards. For cost reduction purposes, the UE is implemented with common radio and baseband components in which the USIMs share access. As a result, only one USIM can be active at any one time. The user purchases a USIM upon arrival for access to cellular services while traveling within the destination country. The travel USIM card provides services for local voice, text, and high-speed data while the home USIM card is mostly used to provide voice and text that the user may want to receive while traveling.

Use Case 2:

Another prominent use case that takes advantage of multiple USIMs centers around a user who has both business and personal subscription services and wants to use both services on the same device. The user has a corporate issued UE with subscription services for USIM 1 with operator 1 while the user also has a personal subscription service for USIM 2 with operator 2. The user wants to be able to receive voice calls from either service and access data services according to the subscriptions to either USIM 1 or USIM 2 depending on the time of day or on the application that is using the service.

Deployment Scenarios

Multi-SIM deployment scenarios may include one more of the following deployment scenarios in terms of each of the following subsystems.

Core Network: a) both SIM in 5GS; b) both SIMs in EPS; c) SIM A in 5GS and SIM B in EPS. d) SIM A and SIM B belongs to the same operator (Intra-MNO case); e) SIM A and SIM B belongs to two different operators (Inter-MNO case).

Radio Access Network (RAN): a) SIM A in LTE and SIM B in LTE; b) SIM A in LTE and SIM B in NR; c) SIM A in NR and SIM B in NR.

UE Capability: a) single RX and single TX; b) dual RX and single TX; c) dual RX and dual TX
AS State combination:
 a): LTE IDLE and NR IDLE or INACTIVE;
 b): LTE CONNECTED and NR IDLE or INACTIVE;
 c): LTE IDLE and NR CONNECTED;
 d) LTE CONNECTED and NR CONNECTED;
 e): NR IDLE or INACTIVE and NR IDLE or INACTIVE;
 f): NR CONNECTED and NR CONNECTED;
 g): NR IDLE or INACTIVE and NR CONNECTED;
 h): LTE IDLE and LTE IDLE;
 i): LTE CONNECTED and LTE CONNECTED;
 j): LTE IDLE and LTE CONNECTED.

PLMN Selection

The PLMN selection procedure can be optimized for Multi-SIM UEs, wherein such optimized PLMN selection procedure is denoted hereinafter multi-PLMN selection procedure. An Equivalent PLMN (EPLMN) list per SIM may be configured into the UE per SIM. The UE stores a list of "equivalent PLMNs" per SIM.

In the UE, the AS shall report available PLMNs to the NAS on request from the NAS or autonomously. The request from NAS may be on per SIM basis or per UE basis, or may be for more than one SIM. The indication of available PLMNs by the AS to the NAS may be on per SIM basis. During PLMN selection for a SIM, based on the list of PLMN identities in priority order, the particular PLMN may be selected either automatically or manually. Each PLMN in the list of PLMN identities for each SIM is identified by a 'PLMN identity'.

In the system information on the broadcast channel, the UE can receive one or multiple 'PLMN identity' in a given cell per SIM. The result of the PLMN selection for a SIM performed by NAS is an identifier of the selected PLMN. The result of the multi-PLMN selection procedure is a list of identifiers of the selected PLMNs, with one selected PLMN per SIM. When the UE reselects to a cell in a shared network, and the cell is a suitable cell for multiple PLMN identities received in the system information, the AS indicates these multiple PLMN identities to the NAS according. The indication of PLMN identities reported by the AS to the NAS may be per SIM. The AS may report to NAS, the fact that a set of available PLMNs associated with different SIMs are broadcasted by the same cell, or the same frequency carrier, or the same RAT. For each applicable SIM, the UE shall choose one of these PLMNs. If the registered PLMN for a SIM is available among these PLMNs, the UE shall not choose a different PLMN. In an alternative embodiment, if a registered PLMN is available among these PLMNs the UE shall not choose a different PLMN or alternatively, if one or more registered PLMN are available among these PLMNs, the UE shall not choose PLMN(s) different from the registered PLMN(s). Applicable SIM means a SIM for which one or more of the PLMNs, configured into the UE for that SIM, are being broadcasted by the cell the UE reselects to i.e., the cell selected by the UE as a result of the cell reselection procedure.

The search for PLMNs may be stopped on request from the NAS on per SIM basis i.e., the NAS per request to the AS to stop PLMN search on per SIM basis.

Cell Selection and Reselection

UE shall perform measurements for cell selection and reselection purposes as specified in TS 38.133. According to the legacy UE behavior, when camped on a call, the UE shall regularly search for a better cell according to the cell reselection criteria, according to the specified requirement for cell reselection. If a better cell is found, then that cell is selected. It is envisaged that in support of the search for a better cell when a Multi-SIM UE is operating in a Multi-SIM power saving mode, a Multi-SIM power saving mode specific duty cycle and cell reselection criteria be specified. The UE may apply different measurement performance requirements, or different configuration parameter sets for cell selection or cell reselection in a reduced power or Multi-SIM power saving mode. The application of different measurement performance requirement, or the application of different configuration parameters in the evaluation of the cell selection or reselection criteria by the UE may depend on the capabilities exchanged or capability coordination result between the UE and the network, and the state of the UE. For example, a UE that is operating in Multi-SIM power saving mode may perform measurements according to a relaxed set of specified measurement requirements, in comparison to a UE that is not operating in Multi-SIM power saving mode. For example, in support of cell re-selection, the Multi-SIM power saving mode relaxed set of measurement requirements or relaxed cell evaluation criteria might consist of one or more of the following requirements:

UE measurement Capability: In the legacy system, the UE shall be capable of monitoring at least:
 Intra-frequency carrier,
 Depending on UE capability, 7 NR inter-frequency carriers,
 Depending on UE capability, 7 FDD E-UTRA inter-RAT carriers,
 Depending on UE capability, 7 TDD E-UTRA inter-RAT carriers.

In addition to the requirements defined above, a UE supporting E-UTRA measurements in RRC_IDLE state shall be capable of monitoring a total of at least 14 carrier frequency layers, which includes serving layer, comprising of any above defined combination of E-UTRA FDD, E-UTRA TDD and NR layers.

For Multi-SIM UEs and particularly Multi-SIM UEs operating in Multi-SIM power saving mode operation, it is envisaged to consider the capability above as the capability budget across the networks associated with the SIMs i.e., the serving SIMs or the SIMs on which the UE is expected to receive service. In one embodiment, the UE may split the capability between the networks associated with the serving SIMs, an example of split may be equal split between the networks associated with the serving SIMs. The split may be based on UE autonomous decision or based on network configuration or based on a combination of both network configuration into the UE and some UE decisions. In another embodiment, the network may configure the UE with Multi-SIM operation specific frequency layer, for example in order to assist the UE with relaxed measurement requirement. Such configuration may be provided in system information broadcast, or in RRC dedicated signaling for example RRC connection release include release with suspend for use by the UE once in RRC Idle or RRC Inactive state. Yet in another embodiment, in a Multi-SIM power saving mode operation, the UE may operate as per the legacy frequency layer measurement capability as the one described above with the assumption that the capability is per serving SIM, but proportionally reduce the measurement duty cycle i.e., how often measurements are performed or the sample size of measurements.

Measurement and Evaluation of Serving Cell

In the legacy system for non-Multi-SIM UEs, The UE shall measure the SS-RSRP and SS-RSRQ level of the serving cell and evaluate the cell selection criterion S defined in TS 38.304 for the serving cell at least once every M1*N1 DRX cycle; where: M1=2 if SMTC periodicity ($T_{SMTC}$)>20 MS and DRX cycle ≤0.64 second, otherwise M1=1. It is envisaged that parameters M1, N1 or $T_{SMTC}$ be adjusted to reduce measurement burden on Multi-SIM UE, or different values of M1, N1, $T_{SMTC}$, be specified or configured into the UE in support of Multi-SIM power saving mode operation. A Multi-SIM UE may use these relaxed values to reduce measurement overhead and save power, If the UE has evaluated in Nserv consecutive DRX cycles that the serving cell does not fulfil the cell selection criterion S, the UE shall initiate the measurements of all neighbor cells indicated by the serving cell, regardless of the measurement rules currently limiting UE measurement activities. It is envisaged that Nserv be adjusted or different value of Nserv be specified or configured into the UE in support of Multi-SIM power saving mode operation, in order to reduce measurement burden of Multi-SIM UE. A Multi-SIM UE may use a relaxed value of Nserv to reduce measurement overhead and save power.

It is currently specified that if the UE in RRC_IDLE has not found any new suitable cell based on searches and measurements using the intra-frequency, inter-frequency and inter-RAT information indicated in the system information for 10 s, the UE shall initiate cell selection procedures for the selected PLMN as defined in TS 38.304. It is envisaged that the 10 s requirement be relaxed with a different value specified or configured into the UE in support of Multi-SIM power saving mode operation, in order to reduce measurement burden of Multi-SIM UE. A Multi-SIM UE may use a relaxed value to reduce measurement overhead and save power.

Measurements of Intra-Frequency NR Cells

The following parameters are used in the current specification to control measurements of intra-frequency NR cells: $T_{detect,NR\_Intra}$, $T_{reselection}$, $T_{measure,NR\_Intra}$, $T_{evaluate,NR\_Intra}$, N1, M2, SMTC periodicity, rangeToBestCell, absThreshSS-BlocksConsolidation. It is envisaged that these parameters used in the definition of intra-frequency NR cells measurement be relaxed to different specified values or values configured into the UE in support of Multi-SIM power saving mode operation, in order to reduce measurement burden of Multi-SIM UE. A Multi-SIM UE may use these relaxed values to reduce measurement overhead and save power.

Measurements of Inter-Frequency NR Cells

The following parameters or conditions are used in the current specification to control the measurements of inter-frequency NR cells:

If Srxlev>$S_{nonIntraSearchP}$ and Squal>$S_{nonIntraSearchQ}$ then the UE shall search for inter-frequency layers of higher priority at least every $T_{higher\_priority\_search}$ where $T_{higher\_priority\_search}$, where $T_{higher\_priority\_search}$ is specified such that the UE shall search every layer of higher priority at least every $T_{higher\_priority\_search}=([60] *N_{layers})$ seconds, where $N_{layers}$ is the total number of higher priority NR and E-UTRA carrier frequencies broadcasted in system information.

If Srxlev≤$S_{nonIntraSearchP}$ or Squal≤$S_{nonIntraSearchQ}$ then the UE shall search for and measure inter-frequency layers of higher, equal or lower priority in preparation for possible reselection. In this scenario, the minimum rate at which the UE is required to search for and measure higher priority layers shall be the same as specified.

Additional parameters used for the control of the inter-frequency measurements include: N1, $T_{SMTC\_intra}$, $T_{SMTC\_inter}$, $K_{carrier}$, $T_{detect,NR\_Inter}$, $T_{reselection}$, $T_{measure,NR\_Inter}$, $T_{evaluate,NR\_Inter}$, rangeToBestCell, absThreshSS-BlocksConsolidation. $T_{SMTC\_intra}$ and $T_{SMTC\_inter}$ are periodicities of the SMTC occasions configured for the intra-frequency carrier and the inter-frequency carrier respectively. The parameter Kcarrier is the number of NR inter-frequency carriers indicated by the serving cell.

It is envisaged according to this application the parameters above including the parameters used in the condition or cell search condition or other measurement performance requirements for inter-frequency measurements such as minimum measurement rate (i.e., measurement duty cycle), be relaxed to different specified values or values configured into the UE in support of Multi-SIM power saving mode operation, in order to reduce measurement burden of Multi-SIM UE. A Multi-SIM UE may use these relaxed values to reduce measurement overhead and save power, Measurement for inter-RAT E-UTRAN cells is specified as follow. For non-Multi-SIM UEs i.e., Single-SIM UEs, if Srxlev>$S_{nonIntraSearchP}$ and Squal>$S_{nonIntraSearchQ}$ then the UE shall search for inter-RAT E-UTRAN layers of higher priority at least every $T_{higher\_priority\_search}$ where $T_{higher\_priority\_search}$ is specified such that the UE shall search every layer of higher priority at least every $T_{higher\_priority\_search}=([60] *N_{layers})$ seconds, where $N_{layers}$ is the total number of higher priority NR and E-UTRA carrier frequencies broadcasted in system information. If Srxlev≤$S_{nonIntraSearchP}$ or Squal≤$S_{nonIntraSearchQ}$ then the UE shall search for and measure inter-RAT E-UTRAN layers of higher, lower priority in preparation for possible reselection. In this scenario, the minimum rate at which the UE is required to search for and measure higher priority inter-RAT E-UTRAN layers shall be the same as that defined here for lower priority RATs. The UE shall be able to evaluate whether a newly detectable inter-RAT E-UTRAN cell meets the reselection criteria within $(N_{EUTRA\_carrier})*T_{detect,EUTRAN}$ when Srxlev≤$S_{nonIntraSearchP}$ or Squal≤$S_{nonIntraSearchQ}$ when $T_{reselection}=0$ provided that the reselection criteria is met by a margin of at least 6 dB for RSRP reselections based on absolute priorities or 4 dB for RSRQ reselections based on absolute priorities. Cells which have been detected shall be measured at least every $(N_{EUTRA\_carrier})*T_{measure,EUTRAN}$ when Srxlev≤$S_{nonIntraSearchP}$ or Squal≤$S_{nonIntraSearchQ}$. When higher priority cells are found by the higher priority search, they shall be measured at least every $T_{measure,EUTRAN}$. For a cell that has been already detected, but that has not been reselected to, the filtering shall be such that the UE shall be capable of evaluating that an already identified inter-RAT E-UTRA cell has met reselection criterion defined in TS 38.304 [1] within $(N_{EUTRA\_carrier})*T_{evaluate,EUTRAN}$ when $T_{reselection}=0$, where $T_{evaluate,EUTRAN}$ possible values are as defined in the specification and the parameter $N_{EUTRA\_carrier}$ is the total number of configured E-UTRA carriers in the neighbour frequency list provided that the reselection criteria is met by a margin of at least 6 dB for RSRP reselections based on absolute priorities or 4 dB for RSRQ reselections based on absolute priorities. If $T_{reselection}$ timer has a non-zero value and the inter-RAT E-UTRA cell is satisfied with the reselection criteria, the UE shall evaluate this E-UTRA cell for the $T_{reselection}$ time. If this cell remains satisfied with the reselection criteria within this duration, then the UE shall reselect that cell.

It is envisaged from the cell search criteria above, cell reselection evaluation criteria and the associated measurements performance requirements for inter-RAT measurements such as minimum measurement rate (i.e., measurement duty cycle), be relaxed with different specified values or values configured into the UE in support of Multi-SIM power saving mode operation, in order to reduce measurement burden of Multi-SIM UE. A Multi-SIM UE may use these relaxed values to reduce measurement overhead and save power, Maximum interruption in paging reception due to cell reselection: It is envisaged to relax for Multi-SIM power saving mode operation, the maximum interruption time in paging reception requirement as a result of cell reselection. A Multi-SIM UE may use a relaxed maximum interruption time of paging reception. Parameters impacting the determination of the interruption time such as $T_{SI-NR}$, $T_{target\_cell\_SMTC\_period}$, $T_{SI-EUTRA}$ may be relaxed. For example, the UE may scale these parameters or the paging interruption time to allow a longer interruption time. Such scaling may take into account the number of serving SIMs. Alternatively, parameters such as $T_{SI-NR}$, $T_{target\_cell\_SMTC\_period}$, $T_{SI-EUTRA}$, specific for Multi-SIM power saving mode operation may be configured into the UE by the network. $T_{SI-NR}$ is the time required for receiving all the relevant system information data according to the reception procedure and the RRC procedure delay of system information blocks for an NR cell. $T_{SI-EUTRA}$ is the time required for receiving all the relevant system information data according to the reception procedure and the RRC procedure delay of system information blocks for an E-UTRAN cell. A Multi-SIM UE may use these relaxed values to reduce measurement overhead and save power.

States and State Transitions in RRC_IDLE State and RRC_INACTIVE State

Figure 3:
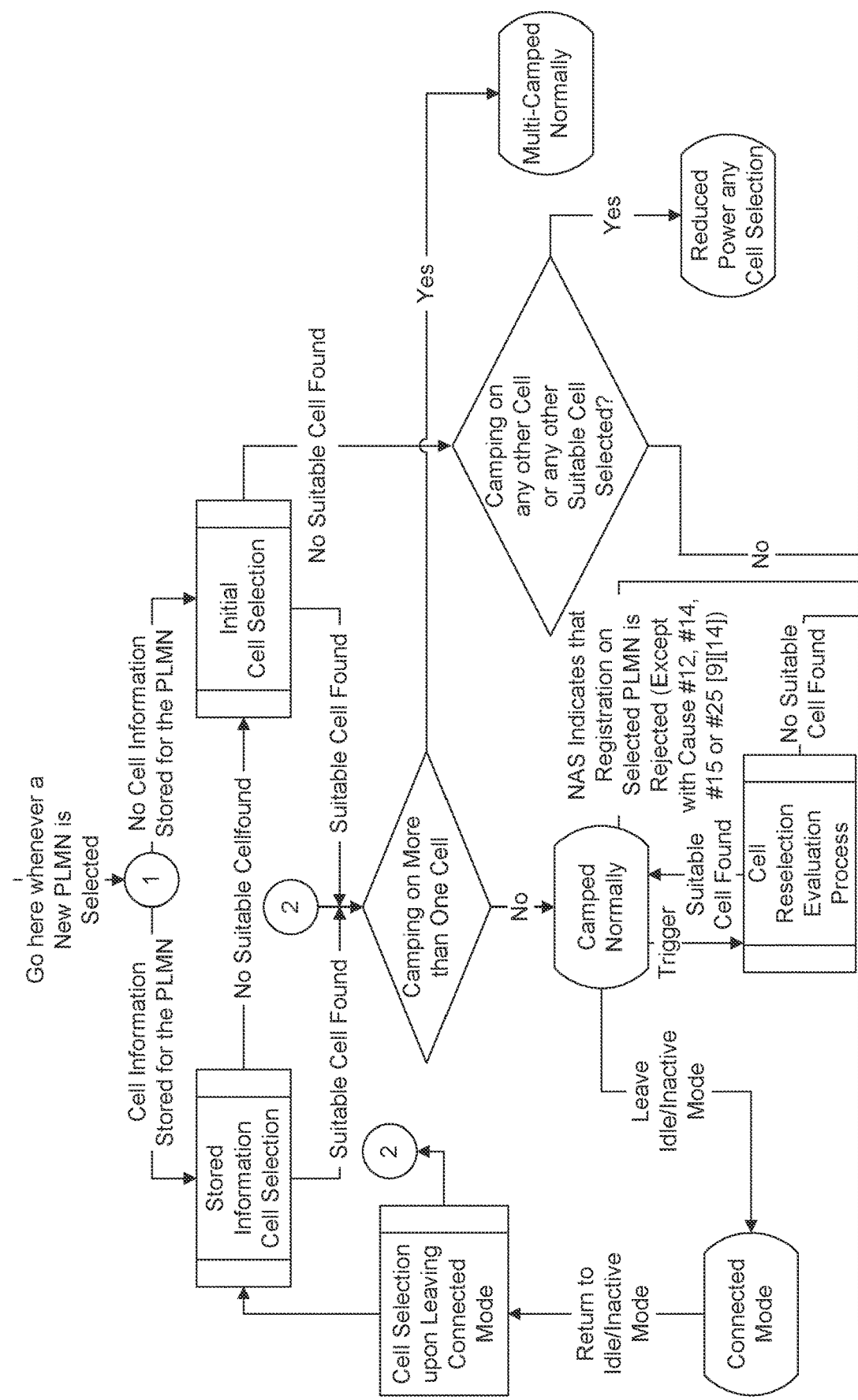
FIG. 3 illustrates RRC idle and RRC inactive cell selection and reselection in accordance with an aspect of the application.
Figure 3:
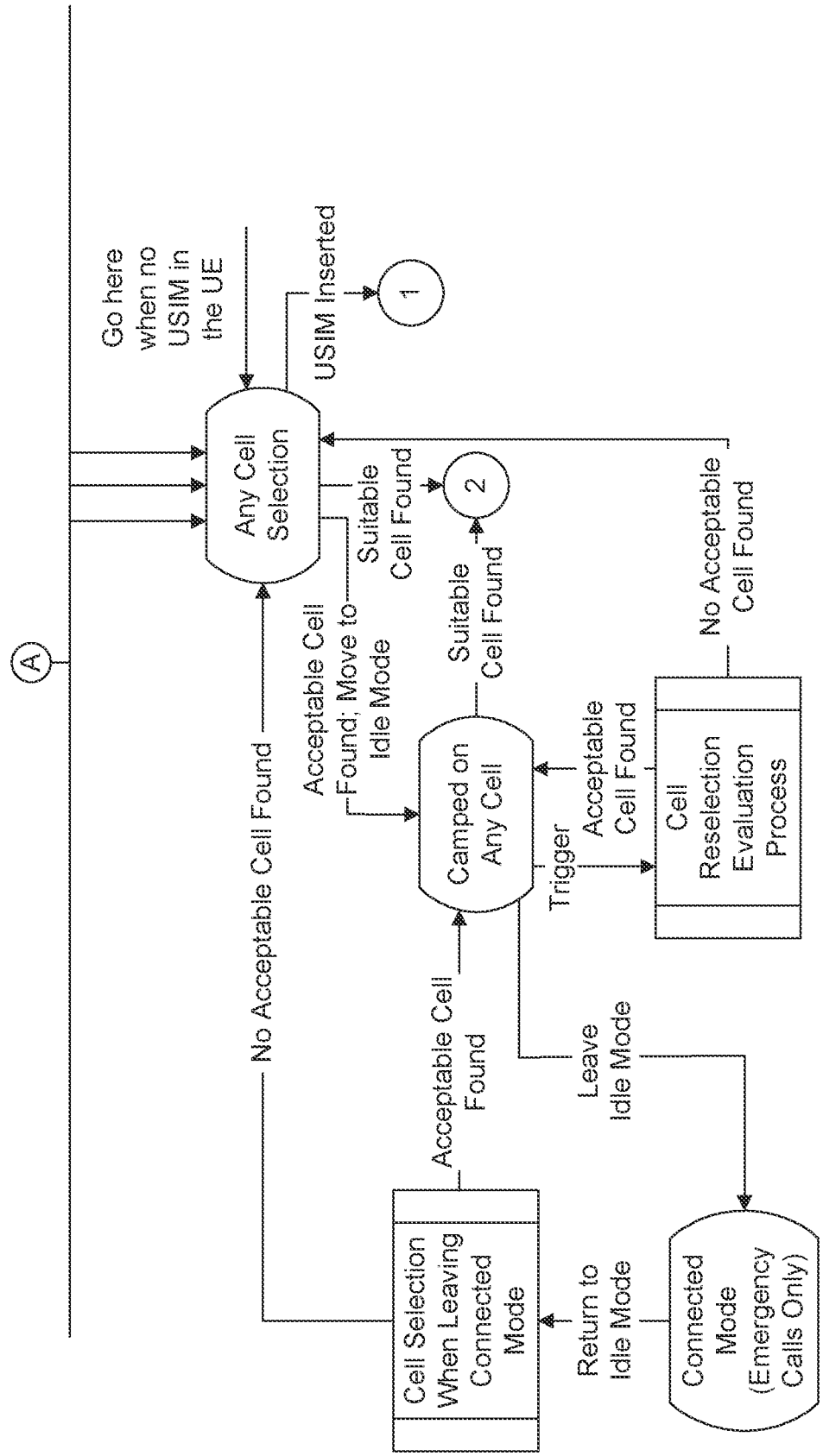
Figure 4:
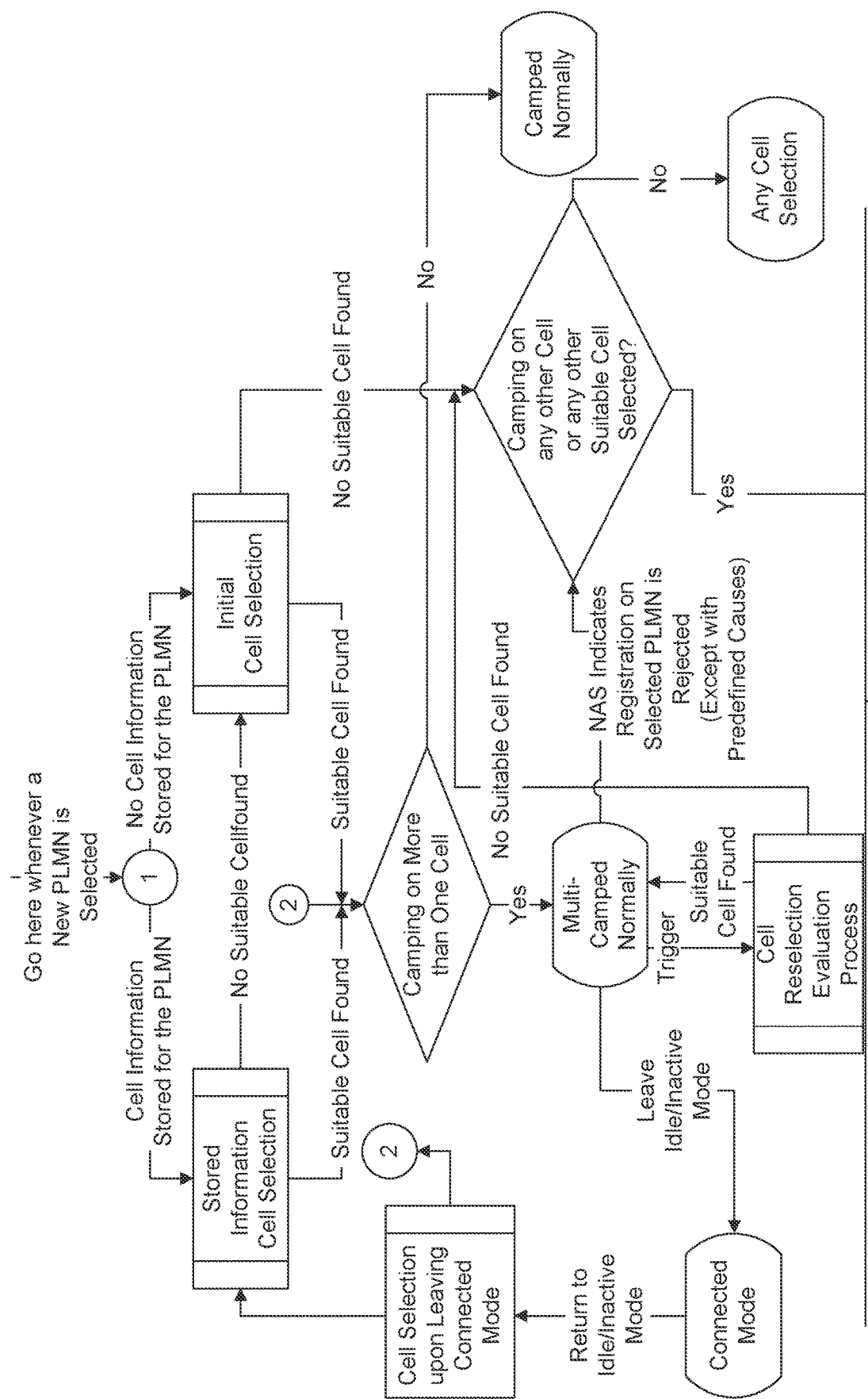
FIG. 4 illustrates RRC idle and RRC inactive cell selection and reselection in accordance with another aspect of the application.
Figure 4:
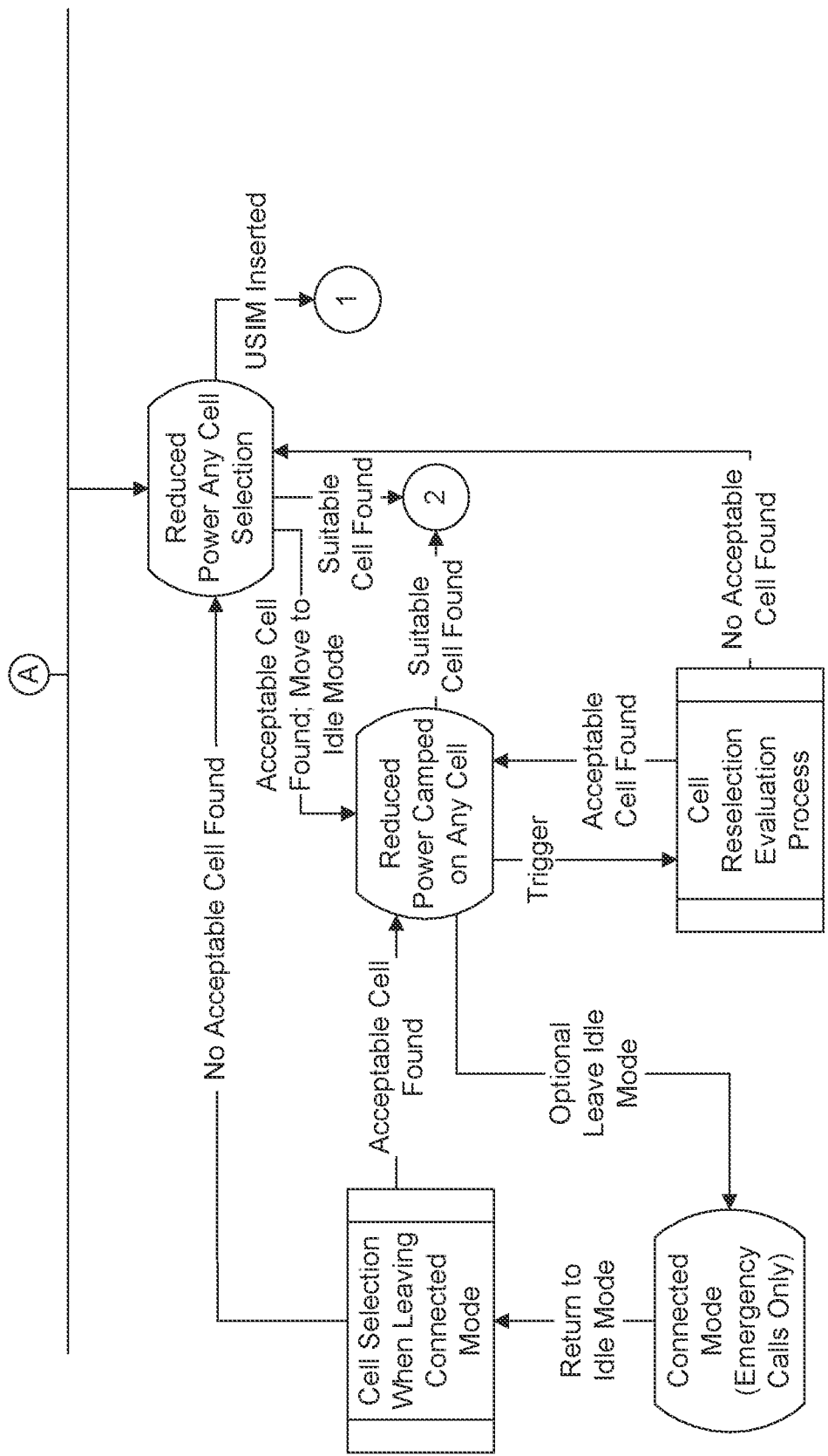
Figure 5:
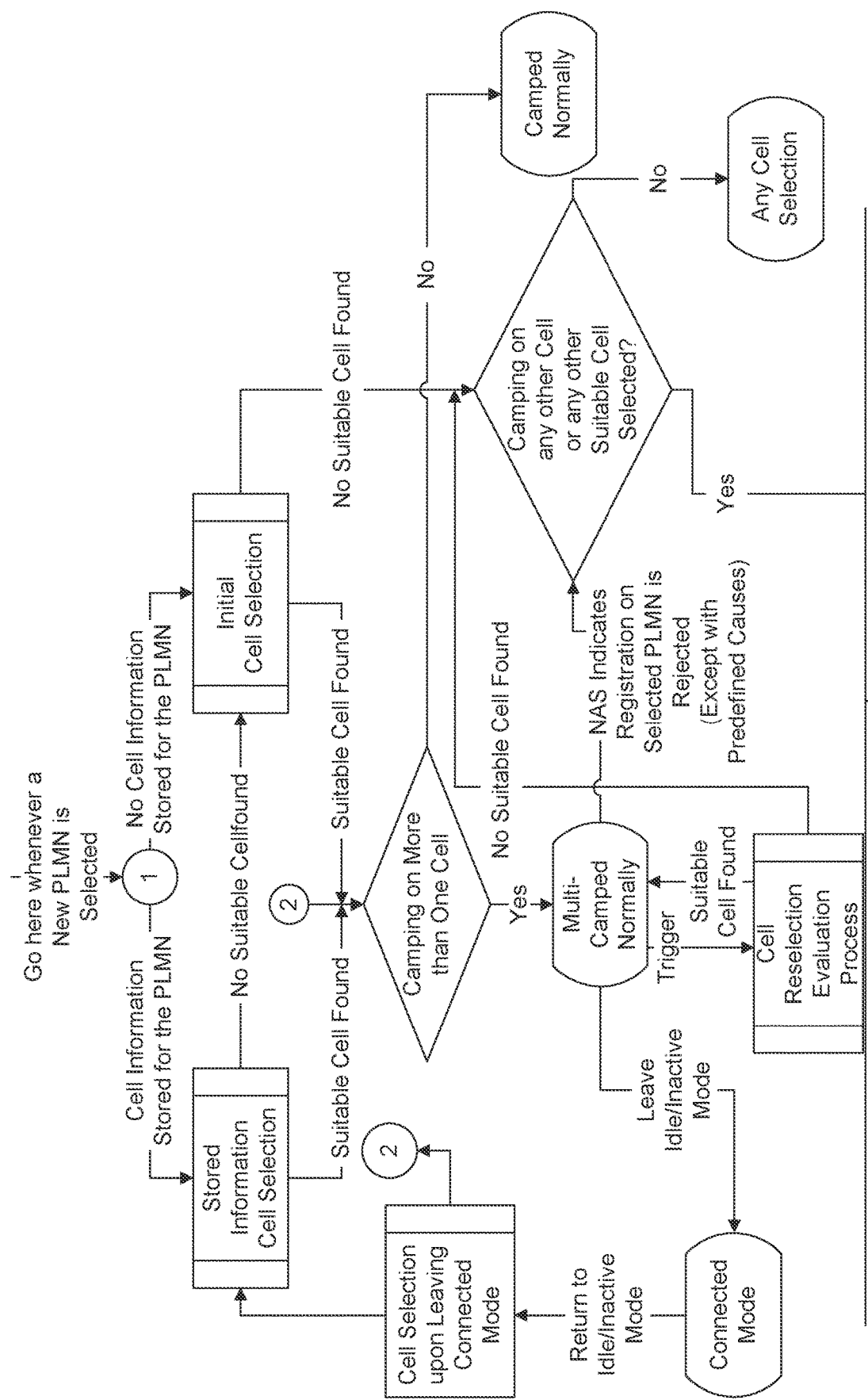
FIG. 5 illustrates RRC idle and RRC inactive cell selection and reselection in accordance with yet another aspect of the application.
Figure 5:
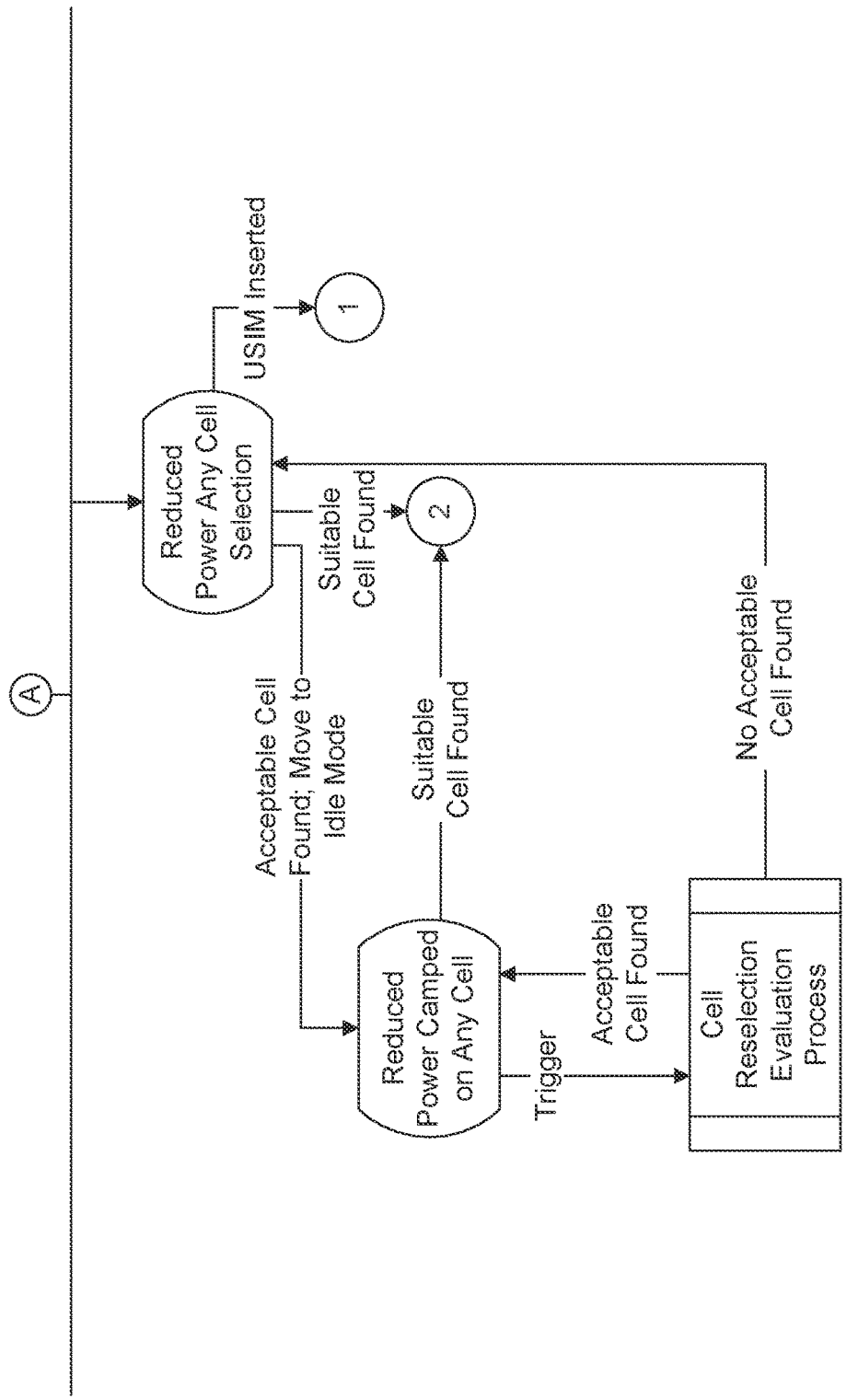

An update to the currently specified states and state transitions in support of Multi-SIM operation and the envisaged Multi-SIM power saving mode of operation is envisaged according this application. FIGS. 3, 4 and 5 illustrate the update to states and state transitions and procedures in RRC_IDLE and RRC_INACTIVE. For example, whenever a new PLMN selection is performed, it causes an exit to number 1. New power saving mode states are introduced in support of reduced power consumption for cell selection, cell reselection, UE camping and related procedures. The new power saving mode states include Multi-Camped Normally state, Reduced Power Any Cell Selection state, Reduced Power Camped on Any Cell state. Multi-Camped Normally state and Reduced Power Camped on Any Cell state are both multi-camping state, where the UE is allowed to camp on a RAT associated with one SIM while at the same time the UE camps, on a RAT of another SIM, or on one or more other RATs of one other SIM, or on one or more other RATs, wherein each RAT serves different SIMs.

The UE initial state could be either single camping state or multi-camping state. The UE may change its state from single camping state to multi-camping state. Alternatively, the UE may change its state from multi-camping state to single camping state. In Camped Normally State or Multi-Camped Normally Camped state, a Multi-SIM UE is allowed to select a cell in another inter-RAT or intra-RAT serving another SIM while remaining camped on the current cell. Similarly, in Camped Normally State or Multi-Camped Normally Camped state, a Multi-SIM UE is allowed to reselect to another cell in another inter-RAT or intra-RAT serving another SIM while remaining camped on the current cell. In Camped on Any Cell state or Reduced Power Camped on Any Cell state, a Multi-SIM UE is allowed to select a cell in another inter-RAT or intra-RAT serving another SIM while remaining camped on the current cell. Similarly, in Camped on Any Cell state or in Reduced Power Camped on Any Cell state, a Multi-SIM UE is allowed to reselect to another cell in another inter-RAT or intra-RAT serving another SIM while remaining camped on the current cell. While Camped Normally state and Multi-Camped Normally state are assigned different names, these two states may be modelled as a single state or assigned the same name for the purpose of modeling and describing the UE behavior when camped normally. Similarly, while Camped on Any Cell state or Reduced Power Camped on Any Cell state are assigned different names herein, these two states may be modelled as a single state or assigned the same name for the purpose of modeling and describing the UE behavior when in any cell camped state.

Camped Normally state, Multi-Camped Normally state, Camped on Any Cell state or Reduced Power Camped on Any Cell State are applicable for RRC_IDLE and RRC_INACTIVE State. Furthermore, the terms Multi-Camped Normally state and Reduced Power Camped Normally state will be used interchangeably and mean the same thing. Similarly, the terms Reduced Power Camped on Any Cell state and Multi-Camped on Any Cell state will be used interchangeably and mean the same thing.

In Multi-Camped Normally state, the UE is camped normally for two or more serving SIMs. The UE may be in RRC_IDLE or RRC_INACTIVE on two or more SIMs. The UE uses relaxed measurement and cell evaluation criteria for cell selection or cell reselection. The UE may be configured by the network with relaxed measurement and cell evaluation criteria for cell selection or cell reselection, specific to this state. In this state, if the cell selection process fails to find a suitable cell after a complete scan of all RATs and all frequency bands supported by the UE, the UE is not required to find an acceptable cell, and may transition to Reduced Power Any Cell Selection state as long as the UE remained normally camped on at least one other cell with respect to one of the serving SIM. The UE may remain on Any Cell Selection state for a SIM where cell reselection process fails, and performs measurements and cell evaluations for cell selection, or cell reselection according to relaxed measurement and relaxed cell evaluation criteria.

In Reduced Power Any Cell Selection state, the UE is in Camped Normally state for at least one serving SIM and is in Any Cell Selection state on at least one other SIM. The UE uses relaxed measurement and cell evaluation criteria for cell selection or cell reselection. The UE may be configured by the network with relaxed measurement and cell evaluation criteria for cell selection or cell reselection, specific to this state. In this state, if the cell selection process fails to find a suitable cell after a complete scan of all RATs and all frequency bands supported by the UE, the UE is not required to find an acceptable cell as long as the UE remained normally camped on at least one other serving SIM, or as long as the UE is in Any Cell Selection state on at least one other serving SIM. The UE may remain on Any Cell Selection state for a SIM where cell reselection process fails, and performs measurements and cell evaluations for cell selection, or cell reselection according to relaxed measurement and relaxed cell evaluation criteria. The UE may transition to Reduced Power Camped on any cell state from this state, for example when the cell selection process fails to find a suitable cell or an acceptable cell after a complete scan of all RATs and all frequency bands supported by the UE, and the UE is not in a Normally Camped state on any other serving SIM.

In Reduced Power Camp on any cell state, the UE may be in Any Cell Selection state for at least one serving SIM and in Camped on Any Cell state for at least one serving SIM.

The UE uses relaxed measurement and cell evaluation criteria for cell selection or cell reselection. The UE may be configured by the network with relaxed measurement and cell evaluation criteria for cell selection or cell reselection, specific to this state. In this state, if the cell selection process fails to find a suitable cell after a complete scan of all RATs and all frequency bands supported by the UE, the UE may not be required to find an acceptable cell as long as the UE found an acceptable cell on at least one other serving SIM, or as long as the UE is in Any Cell Selection state on at least one other serving SIM.

Cell Selection Process

Cell selection is performed by one of the following two procedures:

a) Initial cell selection (no prior knowledge of which RF channels are NR frequencies):

1. The UE shall scan all RF channels in the NR bands according to its capabilities to find a suitable cell. It should be noted that in case of RAN sharing, the suitable cell may be part of either the selected PLMN, the registered PLMN, or PLMN of the Equivalent PLMN list for more than one serving SIM. In other words, the suitable cell may satisfy suitability criteria for several PLMNs where each PLMN is either the selected PLMN, the registered PLMN, or PLMN of the Equivalent PLMN list for a different serving SIM.
2. On each frequency, the UE need only search for the strongest cell.
3. Once a suitable cell is found, this cell shall be selected.
4. The procedure continues until a suitable cell is found for each serving SIM i.e., for each of the selected PLMN (or equivalently the registered PLMN or PLMN of the Equivalent PLMN list) per serving SIM, provided to the AS by the NAS, or the RF channels in the RAT bands according to the UE capabilities are exhausted, whichever comes first.

b) Cell selection by leveraging stored information:

1. This procedure requires stored information of frequencies and optionally also information on cell parameters from previously received measurement control information elements or from previously detected cells.
2. Once the UE has found a suitable cell, the UE shall select it.
3. The procedure continues until a suitable cell is found for each serving SIM i.e., for each of the selected PLMN (or equivalently the registered PLMN or PLMN of the Equivalent PLMN list) per serving SIM, provided to the AS by the NAS, or the RF channels in the RAT bands according to the UE capabilities are exhausted, whichever comes first.
4. If no suitable cell is found for at least one of the serving SIM i.e., for at least one of the selected PLMN (or equivalently the registered PLMN or PLMN of the Equivalent PLMN list) for at least one of the serving SIM, the initial cell selection procedure in a) shall be restarted.

Cell Selection Criterion

A parameter set specific to Multi-SIM power saving mode operation may be configured into the UE for the evaluation of cell selection criteria. The UE uses the Multi-SIM power saving specific configuration parameter set for cell selection. Such parameter set may include one or more of the following parameters: $Qoffset_{temp}$, $Q_{rxlevmin}$, $Q_{qualmin}$, $Q_{rxlevminoffset}$, $Q_{equalminoffset}$, $P_{compensation}$, $P_{EMAX1}$, $P_{EMAX2}$, $P_{PowerClass}$.

Cell Reselection Evaluation Process/Reselection Priorities Handling

Absolute priorities of different NR frequencies or inter-RAT frequencies specific to Multi-SIM operation may be provided to the UE in the system information, in the RRCRelease message, or by inheriting from another RAT at inter-RAT cell (re)selection. The UE may use a frequency priority specific to Multi-SIM operation in support of cell reselection. When the UE is configured with frequency priorities specific to Multi-SIM operation, the UE considers these frequencies to have higher priority than the priority of other frequencies that can be used for Multi-SIM operation for e.g., configured for Multi-SIM operation but with no priority value configured. The UE may consider frequencies configured for RAN sharing, as higher priority than other frequencies if the resulting reselected cell is configured to serve PLMNs of more than one serving SIM. The UE may know if the resulting reselected cell is configured to serve PLMNs of more than one serving SIM if for example the UE reads from the system information broadcasted from the cell, PLMNs' identities for more than one serving SIM.

Measurement Rules for Cell Re-Selection

In order to limit needed measurement in support of cell reselection evaluation, the current rules are specified:

If the serving cell fulfils $Srxlev > S_{IntraSearchP}$ and $Squal > S_{IntraSearchQ}$, the UE may choose not to perform intra-frequency measurements.

"If the serving cell fulfils $Srxlev > S_{nonIntraSearchP}$ and $Squal > S_{nonIntraSearchQ}$, the UE may choose not to perform measurements of NR inter-frequencies or inter-RAT frequency cells of equal or lower priority.

It is envisaged by the inventors that in order to support of Multi-SIM power saving mode operation, the threshold parameters $S_{IntraSearchP}$, $S_{IntraSearchQ}$, $S_{nonIntraSearchP}$, $S_{nonIntraSearchQ}$ specific to Multi-SIM power saving mode operation should be configured into the UE. The UE uses the values of these thresholds specifically configured for Multi-SIM power saving mode operation to evaluate the criteria for whether or not to perform intra-frequency, inter-frequency or inter-RAT cell reselection measurements.

With respect to aspects in this application to configure the UE with parameters specific to Multi-SIM power saving mode operation, such configuration may be done in the form of configuration of absolute values or may be done in the form of offsets relative to the equivalent configuration parameters configured into the UE for non-Multi-SIM or non-power saving mode operation. The network may configure into the UE, the parameters through system information signaling or dedicated signaling such as RRC release message or RRC release with suspend message. A new SIB that includes configuration parameters for proper operation of a Multi-SIM UE may be specified.

Mobility States of a UE

The network controls the UE mobility state with the following parameters configured into the UE through system information broadcasted from the serving cell: $T_{CRmax}$, $N_{CR\_H}$, $N_{CR\_M}$ and $T_{CRmaxHyst}$. The parameters $Treselection_{NR}$ and $Treselection_{EUTRA}$, for NR RAT and E-UTRA RAT respectively, used to control how long cell reselection criteria fulfilment should last before a UE reselect to a cell, are scaled according to the UE mobility state. Similarly, the parameter Qhyst, that specifies the hysteresis value for ranking criteria used for intra-frequency or equal priority inter-frequency cell reselection criteria is scaled according to the UE mobility state. It is envisaged that the UE controls UE mobility state with a set of mobility state control parameters ($T_{CRmax}$, $N_{CR\_H}$, $N_{CR\_M}$) specific to Multi-SIM UE Operation. Furthermore, it envisaged the UE scales parameters $Treselection_{NR}$ or $Treselection_{EUTRA}$ differently, in order words, the UE applies different scaling factors to $Treselection_{NR}$ or $Treselection_{EUTRA}$, when operating in Multi-SIM power saving mode, in order to ease the burden of measurements and save power. The UE may apply different scaling factor values to $Treselection_{NR}$ or $Treselection_{EUTRA}$, according to the UE mobility state for e.g., high mobility state versus medium mobility state. It is also envisaged that the UE scales differently the parameter Qhyst, in order words, the UE applies different scaling factor to the parameter Qhyst, when operating in Multi-SIM power saving mode, in order to ease the burden of measurements. The UE may apply different scaling factor value to Qhys, according to the UE mobility state for e.g., high mobility state versus medium mobility state.

NR Inter-Frequency and Inter-RAT Cell Reselection Criteria

NR Inter-frequency and inter-RAT Cell Reselection criteria are currently specified as follows:

If threshServingLowQ is broadcast in system information and more than 1 second has elapsed since the UE camped on the current serving cell, cell reselection to a cell on a higher priority NR frequency or inter-RAT frequency than the serving frequency shall be performed if:

A cell of a higher priority NR or EUTRAN RAT/frequency fulfils $Squal > Thresh_{X,\ HighQ}$ during a time interval $Treselection_{RAT}$.

Otherwise, cell reselection to a cell on a higher priority NR frequency or inter-RAT frequency than the serving frequency shall be performed if:

A cell of a higher priority RAT/frequency fulfils $Srxlev > Thresh_{X,\ HighP}$ during a time interval $Treselection_{RAT}$; and More than 1 second has elapsed since the UE camped on the current serving cell.

Cell reselection to a cell on an equal priority NR frequency shall be based on ranking for intra-frequency cell reselection as defined herein.

If threshServingLowQ is broadcast in system information and more than 1 second has elapsed since the UE camped on the current serving cell, cell reselection to a cell on a lower priority NR frequency or inter-RAT frequency than the serving frequency shall be performed if:

The serving cell fulfils $Squal < Thresh_{Serving,\ LowQ}$ and a cell of a lower priority NR or E-UTRAN RAT/frequency fulfils $Squal > Thresh_{X,\ LowQ}$ during a time interval $Treselection_{RAT}$.

Otherwise, cell reselection to a cell on a lower priority NR frequency or inter-RAT frequency than the serving frequency shall be performed if:

The serving cell fulfils $Srxlev < Thresh_{Serving,\ LowP}$ and a cell of a lower priority RAT/frequency fulfils $Srxlev > Thresh_{X,\ LowP}$ during a time interval $Treselection_{RAT}$; and More than 1 second has elapsed since the UE camped on the current serving cell.

Cell reselection to a higher priority RAT/frequency shall take precedence over a lower priority RAT/frequency if multiple cells of different priorities fulfil the cell reselection criteria."

It is further envisaged the cell reselection control parameters $Thresh_{X,\ HighQ}$, $Treselection_{RAT}$, $Thresh_{X,\ HighP}$, $Thresh_{Serving,\ LowQ}$, $Thresh_{X,\ LowQ}$, $Thresh_{Serving,\ LowP}$, $Thresh_{X,\ LowP}$ including the 1 second time interval value be relaxed in order to ease the burden of measurements on the UE and reduce power consumption. The network may configure into the UE values for these parameters specific to Multi-SIM UE operation. If configured, the Multi-SIM UE uses parameters specifically configured for Multi-SIM UE operation for the control of cell reselection. The parameters may be configured in the form of absolute values or in the form of offset values relative to equivalent configuration for no Multi-SIM operation or for Multi-SIM operation in no power saving mode. As example of relation on the parameters used to control cell reselection, the network may configure into the UE the parameters $Thresh_{X,\ HighQ}$, $Thresh_{X,\ HighP}$, $Thresh_{X,\ LowQ}$, $Thresh_{X,\ LowP}$ to higher values than values configured for no Multi-SIM operation or Multi-SIM operation in no power saving operation. Similarly, the network may configure into the UE the parameters $Treselection_{RAT}$, $Thresh_{Serving,\ LowQ}$, $Thresh_{X,\ LowP}$ to lower values than values configured for no Multi-SIM operation or Multi-SIM operation in no power saving operation. It is also envisaged that the time interval of 1 second that the UE should remain camp on a cell before reselection to another cell should be relaxed in support of Multi-SIM UE cell reselection. The UE may use a new time interval value. Such value may be proportional to the number of SIMs served by the UE. For example, in the case where the UE is serving two SIMs, the value of the time interval may be 2 seconds, for the case where the UE is serving 3 SIMs, the value of the time interval may be 3 seconds, with possibly a maximum value also configured into the UE regardless of how many SIMs is served by the UE. Similarly, the relaxation of parameters such as $Treselection_{RAT}$, or other parameters use to control cell reselection may be proportional to the number of SIMs served by the UE.

Intra-Frequency and Equal Priority Inter-Frequency Cell Reselection Criteria

A priority may be defined for an intra-frequency cell selection as well. Such priority may be proportional to the number of SIMs served by the UE. For example, the UE may assign a cell broadcasting PLMNs identifiers for two SIMs served by the UE, a higher priority than a cell broadcasting PLMNs identifiers for just one SIM served by the UE. The network may configure the UE which such priority values, or rules for the UE to derives such priority may be specified.

In the case of intra-frequency cell reselection, the UE may use such a priority value to break the tie between equally ranked cells where the rank of the serving cell and the rank of the neighboring cells are determined as specified by the cell ranking criteria.

Similarly, a frequency F1 may be prioritized over another frequency F2 for inter-frequency reselection if the suitable cell on F1 is broadcasting PLMNs identifiers for more SIMs served by the UE than the suitable cell on F2. Such priority may take precedence over other priority configured into the UE for the same frequency layer. Alternatively, this newly introduced frequency priority in the case of RAN sharing may be used to break time between frequency layer during inter-frequency cell reselection, or to break time between suitable cells during inter-frequency cell reselection. The UE uses this priority as defined herein to perform cell reselection.

Camped Normally State and Multi-Camped Normally

When multi-camped normally, the UE shall perform the following tasks:

Monitoring the paging channel of the cell for each serving SIM as specified according to information broadcast in SIB1;

monitor Short Messages transmitted with P-RNTI over DCI for each serving; Requirements of maximum interruption time in paging reception requirement on a serving SIM as a result of operation on another serving SIM for example as a result of cell reselection cell reselection or communication on another serving SIM may be relaxed. Specifically, Parameters impacting the determination of the interruption time such as $T_{SI-NR}$, $T_{target\_cell\_SMTC\_period}$ may be relaxed so as to make allowed interruption time on serving SIM longer.

Monitor relevant System Information for each serving SIM; Requirements of maximum interruption time in system information reception on a serving SIM as a result of operation on another serving SIM for example as a result of cell reselection cell reselection or communication on another serving SIM may be relaxed, so as to allow longer interruption time. The UE may receive system information according to the relaxed maximum interruption time for system information reception.

Perform necessary measurements for the cell reselection evaluation procedure as per the relaxed requirements as envisaged herein:

Execute the cell reselection evaluation process on the following occasions/triggers:
1. UE internal triggers, so as to meet the relaxed cell reselection evaluation performance as specified herein; and
2. When information on the BCCH of a cell associated with any of the serving SIM used for the cell reselection evaluation procedure has been modified.

The UE may provide assistance including configuration information from other serving networks and its capability information as well as capabilities information from other serving networks to the serving network of a serving SIM to assist the network in configuring the proper parameter set, in support of Multi-SIM power saving mode operation.

Selection of Cell at Transition to RRC_IDLE or RRC_INACTIVE State

The following is currently specified:

When returning to RRC_IDLE state after UE moved to RRC_CONNECTED state from camped on any cell state, UE shall attempt to camp on an acceptable cell according to redirectedCarrierInfo, if included in the RRCRelease message. If the UE cannot find an acceptable cell, the UE is allowed to camp on any acceptable cell of the indicated RAT. If the RRCRelease message does not contain redirectedCarrierInfo then the UE shall attempt to select an acceptable cell on an NR frequency.

If no acceptable cell is found according to the above, the UE shall continue to search for an acceptable cell of any PLMN in state any cell selection. It is envisaged that Multi-SIM UE applies this rule to camping on acceptable cell only when the UE is not in "Camped Normally state" in network of another SIM served by the UE. If the UE is in "Camped Normally state" in network of another SIM served by the UE, the UE may not apply this rule, may not camp on acceptable cell and may not continue to search for an acceptable cell of any PLMN in state any cell selection."

Any Cell Selection State and Reduced Power any Cell Selection

The following UE behavior is specified for this state:

This state is applicable for RRC_IDLE and RRC_INACTIVE state. In this state, the UE shall perform a cell selection process to find a suitable cell. If the cell selection process fails to find a suitable cell after a complete scan of all RATs and all frequency bands supported by the UE, the UE shall attempt to find an acceptable cell of any PLMN to camp on, trying all RATs that are supported by the UE and searching first for a high-quality cell, where high-quality cell is specified such that the measured RSRP value shall be greater than or equal to −110 dBm. It is envisaged to modify the behavior of the UE in this state when the UE is operating in Multi-SIM power saving mode state.

Typically, the UE will try to camp on a cell, preferably a suitable cell and if no suitable cell is found, an acceptable cell so that the UE is able to readily place or receive emergency calls or receive public safety messages such as CMAS or ETWS alert messages. In the case of Multi-SIM UEs where the UE is served by more than one SIM, the urgency to camp on a cell, particularly an acceptable cell if no suitable cell is found is greatly diminished since the UE may always engage in emergency call or receive public safety alert messages over the cell of the alternate PLMN the UE is camping on. It is therefore envisaged that in this state, if the cell selection process fails to find a suitable cell, the UE may not attempt to find an acceptable cell. Alternatively, the UE may search for an acceptable cell using relaxed cell selection requirements for example in terms of longer measurement duty cycle i.e., lower measurement minimum rate, lower number of measurement samples or relaxed values of configuration parameters used in the calculation of Srxlev, and Squal so as to reduce measurement burden on the UE.

If the cell selection process fails to find a suitable cell, and the UE didn't attempt to find an acceptable cell, the UE may attempt to find an acceptable cell of any PLMN to camp on, trying all RATs that are supported by the UE and searching first for a high-quality cell, where high-quality cell is specified such that the measured RSRP value shall be greater than or equal to −110 dBm, if the UE is not camping or cease to camp on any other suitable cell or acceptable cell. The UE may search for an acceptable cell using relaxed cell selection requirements for example in terms of longer measurement duty cycle i.e., lower measurement minimum rate, lower number of measurement samples or relaxed values of configuration parameters used in the calculation of Srxlev, and Squal so as to reduce measurement burden on the UE.

Camped on any Cell State and Reduced Power Camped on any Cell State

It is currently specified that when in this state, the UE shall perform:
1. Necessary measurements for the cell reselection evaluation procedure,
2. Execute the cell reselection evaluation process on the following occasions/triggers:
   A. UE internal triggers, so as to meet performance as specified in TS 38.133;
   B. When information on the BCCH used for the cell reselection evaluation procedure has been modified;
3. Regularly attempt to find a suitable cell trying all frequencies of all RATs that are supported by the UE. If a suitable cell is found, UE shall move to camped normally state;
4. If the UE supports voice services and the current cell does not support IMS emergency calls as indicated by the field ims-EmergencySupport in SIB1 as specified in TS 38.331 [3], the UE shall perform cell selection/reselection to an acceptable cell that supports emergency calls in any supported RAT regardless of priorities provided in system information from current cell, if no suitable cell is found.

It is envisaged that in this state, the Multi-SIM UE shall perform the following:
1. Necessary measurements for the cell reselection evaluation procedure, as per the relaxed requirements of cell reselection as envisaged herein.

2. Execute the cell reselection evaluation process on the following occasions/triggers:
    A. UE internal triggers, so as to meet performance as specified in TS 38.133 or the relaxed requirement as defined herein;
    B. When information on the BCCH used for the cell reselection evaluation procedure has been modified;
3. Regularly attempt to find a suitable cell trying all frequencies of all RATs that are supported by the UE. If a suitable cell is found, UE shall move to camped normally state; The search for suitable cell shall be as per the relaxed performance requirements defined herein including relaxed performance requirements for intra-frequency cell reselection, inter-frequency or inter-RAT cell reselection regarding duty cycle or minimum measurement rate, and the various parameters for the controls of cell reselection criteria evaluation and the related measurements.
4. If the UE supports voice services and the current cell does not support IMS emergency calls as indicated by the field ims-EmergencySupport in SIB1 as specified in TS 38.331 [3], the UE may perform cell selection/reselection to an acceptable cell that supports emergency calls in any supported RAT regardless of priorities provided in system information from current cell, if no suitable cell is found, and the UE is not camping or cease to camp on any other cell.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A wireless transmit/receive unit (WTRU) comprising a processor, the processor configured to:
    receive, via a network, an indication of one or more public land mobile networks (PLMNs) and configuration parameters comprising a first threshold associated with a first PLMN and a second threshold associated with a second PLMN, the first threshold and the second threshold associated with a power saving mode;
    select one or more of the PLMNs based on the indication;
    in the power saving mode scan radio frequencies (RFs) to find a cell in the selected one or more PLMNs; and
    based on a priority of the cell of the selected one or more PLMNs apply the first threshold or the second threshold in the power saving mode for evaluation of cell selection criteria to select the cell of the selected one or more PLMNs, wherein the processor is configured to apply the first threshold in the power saving mode when the cell of the selected one or more PLMNs has a priority higher than a current cell and is configured to apply the second threshold in the power saving mode when the cell of the selected one or more PLMNs has a priority lower than the current cell.

2. The WTRU of claim 1, wherein processor is further configured to:
    determine a state of the WTRU to be a multi-camped normally state, a reduced power any cell selection state, a reduced power camped on any cell state, a camped normally state, an any cell selection state, or a camped on any cell state;
    select a suitable cell as a first serving cell, the first serving cell being a cell for a first subscriber identity module (SIM) of a first selected PLMN; and
    determine the state to be the camped normally state when the WTRU is not camping on a cell and based on the first serving cell being a cell for a first SIM of the first selected PLMN.

3. The WTRU of claim 2, wherein the processor is further configured to:
    determine a state of the WTRU to be a multi-camped normally state, a reduced power any cell selection state, a reduced power camped on any cell, a camped normally state, an any cell selection state, or a camped on any cell state;
    select a suitable cell as a second serving cell, the second serving cell being a cell for a second SIM of a second selected PLMN; and
    determine the state to be the multi-camped normally state when the WTRU is camping on the first serving cell and based on the second serving cell being a cell for the second SIM of the second selected PLMN.

4. The WTRU of claim 3, wherein the processor is configured to select the first or second serving cell via a stored information cell selection procedure using at least one of stored information of frequencies, information on cell parameters from previously received measurement control information elements, or from previously detected cells.

5. The WTRU of claim 1, wherein the processor is further configured to:
    determine a state of the WTRU to be a multi-camped normally state, a reduced power any cell selection state, a reduced power camped on any cell state, a camped normally state, an any cell selection state, or a camped on any cell state;
    determine for a subscriber identity module (SIM) of the selected one or more PLMNs that no cell is a suitable cell; and
    determine the state to be the reduced power any cell selection state when the WTRU is camping on a first serving cell and based on a determination that for the SIM of the selected one or more PLMNs that no cell is a suitable cell.

6. The WTRU of claim 1, wherein processor is further configured to:
    determine a state of the WTRU to be a multi-camped normally state, a reduced power any cell selection state, a reduced power camped on any cell state, a camped normally state, an any cell selection state, or a camped on any cell state;
    determine for a subscriber identity module (SIM) of the selected one or more PLMNs that no cell is a suitable cell; and
    determine the state to be the any cell selection state when the WTRU is not camping on a first serving cell and based on a determination that for the SIM of the selected one or more PLMNs that no cell is a suitable cell.

7. The WTRU of claim 1, wherein the processor is configured to select a cell using a multi-subscriber identity module (SIM) power saving parameter.

8. The WTRU of claim 1, wherein the processor is further configured to transmit assistance information associated with a parameter set for a multi-SIM power saving mode operation.

9. The WTRU of claim 1, wherein the processor is configured to select a cell using one or more of relaxed measurement rules, relaxed cell selection rules, or relaxed cell reselection rules.

10. The WTRU of claim 1, wherein the processor is configured to split one or more of measurement capabilities, cell selection evaluation capabilities, or cell reselection evaluation capabilities across serving subscriber identity modules (SIMs).

11. The WTRU of claim 1, wherein the processor is configured to select a cell based on a relaxed maximum interruption time requirement for paging reception for the cell.

12. The WTRU of claim 1, wherein the processor is configured to determine the cell to be an acceptable cell; and
wherein the acceptable cell comprises a characteristic associated with one or more of placement of an emergency call, receipt of an emergency call, or receipt of a public safety message.

13. The WTRU of claim 1, wherein the configuration parameters comprise a third threshold and a fourth threshold associated with a non-power saving mode, wherein the processor is configured to apply the third threshold in the non-power saving mode when the cell of the selected one or more PLMNs has a priority higher than the current cell and is configured to apply the fourth threshold in the non-power saving mode when the cell of the selected one or more PLMNs has a priority lower than the current cell, wherein the first threshold is different than the third threshold, and wherein the second threshold is different than the fourth threshold.

14. The WTRU of claim 13, wherein the first threshold is a predetermined value different than the third threshold, and wherein the second threshold is a predetermined value different than the fourth threshold.

15. A method performed by a wireless transmit/receive unit (WTRU), the method comprising:
receiving, via a network, an indication of one or more public land mobile networks (PLMNs) and configuration parameters comprising a first threshold associated with a first PLMN and a second threshold associated with a second PLMN, the first threshold and the second threshold associated with a power saving mode;
selecting one or more of the PLMNs based on the indication;
in the power saving mode scanning radio frequencies (RFs) for a cell in the selected one or more PLMNs; and
based on a priority of the cell of the selected one or more PLMNs applying the first threshold or the second threshold in the power saving mode for evaluation of cell selection criteria to select the cell of the selected one or more PLMNs, wherein the first threshold is applied in the power saving mode when the cell of the selected one or more PLMNs has a priority higher than a current cell or the second threshold is applied in the power saving mode when the cell of the selected one or more PLMNs has a priority lower than the current cell.

16. The method of claim 15, further comprising:
determining a state of the WTRU to be a multi-camped normally state, a reduced power any cell selection state, a reduced power camped on any cell state, a camped normally state, an any cell selection state, or a camped on any cell state;
determining for a subscriber identity module (SIM) of the selected one or more PLMNs that no cell is a suitable cell; and
determining the state to be the reduced power any cell selection state, when the WTRU is camping on a first serving cell and based on a determination that for the SIM of the selected one or more PLMNs that no cell is a suitable cell, or determining the state to be the any cell selection state when the WTRU is camping on a first serving cell and based on a determination that for the SIM of the selected one or more PLMNs that no cell is a suitable cell.

17. The method of claim 15, wherein scanning the RFs for a cell in the selected one or more PLMNs comprises scanning the RFs for a cell in the selected one or more PLMNs while in the power saving mode.

18. The method of claim 15, wherein the configuration parameters comprise a third threshold and a fourth threshold associated with a non-power saving mode, wherein the method comprises applying the third threshold in the non-power saving mode when the cell of the selected one or more PLMNs has a priority higher than the current cell and applying the fourth threshold in the non-power saving mode when the cell of the selected one or more PLMNs has a priority lower than the current cell, wherein the first threshold is different than the third threshold, and wherein the second threshold is different than the fourth threshold.

19. The method of claim 18, wherein the first threshold is a predetermined value different than the third threshold, and wherein the second threshold is the predetermined value different than the fourth threshold.

* * * * *